United States Patent
Islam et al.

(10) Patent No.: US 10,708,953 B2
(45) Date of Patent: Jul. 7, 2020

(54) RANDOM ACCESS RETRANSMISSION PROCEDURE

(71) Applicant: QUALCOMM Incorporated, San Diego, CA (US)

(72) Inventors: Muhammad Nazmul Islam, Edison, NJ (US); Tao Luo, San Diego, CA (US); Juergen Cezanne, Ocean Township, NJ (US); Sundar Subramanian, Bridgewater, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 165 days.

(21) Appl. No.: 15/391,425

(22) Filed: Dec. 27, 2016

(65) Prior Publication Data
US 2017/0303317 A1 Oct. 19, 2017

Related U.S. Application Data

(60) Provisional application No. 62/343,104, filed on May 30, 2016, provisional application No. 62/324,250, filed on Apr. 18, 2016.

(51) Int. Cl.
*H04W 74/08* (2009.01)
*H04W 72/12* (2009.01)
*H04L 1/08* (2006.01)

(52) U.S. Cl.
CPC ....... *H04W 74/0833* (2013.01); *H04W 72/12* (2013.01); *H04L 1/08* (2013.01)

(58) Field of Classification Search
CPC ...... H04W 74/0833; H04W 72/12; H04L 1/08
See application file for complete search history.

(56) References Cited

U.S. PATENT DOCUMENTS

| | | | |
|---|---|---|---|
| 2010/0041428 A1* | 2/2010 | Chen | H04W 52/16 455/522 |
| 2010/0074204 A1* | 3/2010 | Meylan | H04L 1/1822 370/329 |
| 2010/0165943 A1* | 7/2010 | Kato | H04W 8/26 370/329 |

(Continued)

FOREIGN PATENT DOCUMENTS

| | | |
|---|---|---|
| EP | 2849483 A1 | 3/2015 |
| WO | WO-2016025899 A1 | 2/2016 |

OTHER PUBLICATIONS

International Search Report and Written Opinion—PCT/US2017/027756—ISA/EPO—dated Sep. 29, 2017.

*Primary Examiner* — Sai Aung
*Assistant Examiner* — Liem H. Nguyen
(74) *Attorney, Agent, or Firm* — Loza & Loza, LLP/Qualcomm

(57) ABSTRACT

Aspects of the disclosure relate to improvements in random access procedures within a wireless communication network. To increase the likelihood that a user equipment (UE) will properly decode a random access response message from a base station, the base station may retransmit the random access response message one or more times. The number of retransmissions may be fixed or may be variable depending on whether the base station is able to receive or successfully decode a subsequently transmitted uplink message.

13 Claims, 14 Drawing Sheets

(56) References Cited

U.S. PATENT DOCUMENTS

| | | | |
|---|---|---|---|
| 2013/0051269 A1* | 2/2013 | Suzuki | H04L 1/1812 370/252 |
| 2013/0143502 A1* | 6/2013 | Kazmi | H04W 88/06 455/62 |
| 2014/0198729 A1* | 7/2014 | Bostrom | H04W 24/10 370/328 |
| 2014/0219204 A1 | 8/2014 | Park et al. | |
| 2015/0092740 A1* | 4/2015 | Li | H04L 5/0053 370/330 |
| 2016/0100431 A1* | 4/2016 | Kishiyama | H04W 4/70 370/252 |
| 2016/0219622 A1* | 7/2016 | Liu | H04L 5/0089 |
| 2017/0230951 A1* | 8/2017 | Xiong | H04W 72/042 |
| 2017/0231011 A1* | 8/2017 | Park | H04W 74/006 |
| 2017/0280481 A1* | 9/2017 | Stern-Berkowitz | H04W 74/008 |
| 2017/0311337 A1* | 10/2017 | Mo | H04W 72/12 |
| 2017/0339722 A1* | 11/2017 | Jiao | H04W 68/005 |
| 2018/0042000 A1* | 2/2018 | Zhang | H04W 72/046 |
| 2018/0176947 A1* | 6/2018 | Yu | H04W 74/006 |

\* cited by examiner

RANDOM ACCESS RETRANSMISSION PROCEDURE

PRIORITY CLAIM

This application claims priority to and the benefit of Provisional Patent Application No. 62/324,250 filed in the U.S. Patent and Trademark Office on Apr. 18, 2016, and Provisional Patent Application No. 62/343,104 filed in the U.S. Patent and Trademark Office on May 30, 2016, the entire contents of which are incorporated herein by reference as if fully set forth below in their entirety and for all applicable purposes.

TECHNICAL FIELD

The technology discussed below relates generally to wireless communication systems, and more particularly, to random access procedures in wireless communication systems.

INTRODUCTION

Wireless communication networks are widely deployed to provide various communication services such as telephony, video, data, messaging, broadcasts, and so on. Such networks, which are usually multiple access networks, support communications for multiple users by sharing the available network resources.

In order for a user equipment (UE) to communicate with a base station, such as an Evolved Node B (eNB), the UE informs its presence to the base station. UEs typically inform their presence to the base station initially using a random access procedure in which each UE transmits a randomly selected preamble sequence and the base station allocates resources to detected UEs by transmitting random access response messages to the detected UEs.

However, if a UE is unable to properly decode the random access response message, the UE may need to repeat the random access process, delaying uplink transmissions by the UE. Similarly, if the base station is unable to properly decode a subsequent uplink message, such as a Radio Resource Control (RRC) Connection Request message transmitted from the UE, the UE may need to repeat the random access process.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to improvements in random access procedures within a wireless communication network. To increase the likelihood that a UE will properly decode a random access response message from a base station, the base station may retransmit the random access response message one or more times. In some examples, the number of retransmissions may be predetermined by the base station and the base station may provide the number of retransmissions to the UE. In other examples, the UE may determine the number of retransmissions and provide the number of retransmissions to the base station. The random access response message may further be retransmitted in response to unsuccessfully decoding an uplink message from the UE or if the base station does not receive an uplink message from the UE within a monitoring window In one aspect, a method of wireless communication between a scheduling entity and a set of one or more scheduled entities in a wireless communication network is disclosed. The method includes receiving a random access preamble message at the scheduling entity from a scheduled entity of the set of one or more scheduled entities, transmitting a random access response message from the scheduling entity to the scheduled entity in response to receiving the random access preamble message, and retransmitting the random access response message one or more times from the scheduling entity to the scheduled entity.

Another aspect of the disclosure provides a scheduling entity in a wireless communication network. The scheduling entity includes a transceiver for wireless communication with a set of scheduled entities, a memory, and a processor communicatively coupled to the transceiver and the memory. The processor is configured to receive a random access preamble message at the scheduling entity from a scheduled entity of the set of one or more scheduled entities via the transceiver, transmit a random access response message from the scheduling entity to the scheduled entity in response to receiving the random access preamble message via the transceiver, and retransmit the random access response message one or more times from the scheduling entity to the scheduled entity via the transceiver Another aspect of the disclosure provides a scheduling entity apparatus in a wireless communication network. The scheduling entity apparatus includes means for receiving a random access preamble message at the scheduling entity apparatus from a scheduled entity of a set of one or more scheduled entities, means for transmitting a random access response message from the scheduling entity apparatus to the scheduled entity in response to receiving the random access preamble message, and means for retransmitting the random access response message one or more times from the scheduling entity apparatus to the scheduled entity Examples of additional aspects of the disclosure follow. In some aspects of the disclosure, the method further includes initializing a monitoring timer upon transmission of the random access response message, in which the monitoring timer provides a monitoring window within which the scheduling entity monitors for receipt of an uplink message from the scheduled entity in response to the random access response message, and upon expiration of the monitoring timer prior to receipt of the uplink message, retransmitting the random access response message from the scheduling entity to the scheduled entity.

In some aspects of the disclosure, the method further includes receiving an uplink message at the scheduling entity from the scheduled entity, and upon unsuccessfully decoding the uplink message, retransmitting the random access response message from the scheduling entity to the scheduled entity. In some aspects of the disclosure, the method further includes measuring a signal quality of the uplink message to verify that the uplink message was received from the scheduled entity.

In some aspects of the disclosure, the method further includes determining a total number of retransmissions of the random access response message. In some aspects of the disclosure, the method further includes determining a remaining number of retransmissions of the random access response message after retransmission of the random access response message, and repeating retransmission of the random access response message from the scheduling entity to the scheduled entity based on the remaining number of retransmissions.

In some aspects of the disclosure, the method further includes transmitting, within the random access response message, an indication of a number of subframes used to transmit the random access response message. In some aspects of the disclosure, the method further includes transmitting, within the random access response message, an indication of a number of subframes to be used to retransmit the random access response message.

In some aspects of the disclosure, the method further includes determining the total number of retransmissions of the random access response message and a fixed time gap between each of the retransmissions prior to receiving the random access preamble message from the scheduled entity. In some aspects of the disclosure, the method further includes providing the total number of retransmissions and the fixed time gap between each of the retransmissions to the scheduled entity. In some examples, the method further includes transmitting the total number of retransmissions and the fixed time gap between each of the retransmissions to the scheduled entity over a physical broadcast channel. In other examples, the method further includes transmitting the total number of retransmissions and the fixed time gap between each of the retransmissions to the scheduled entity within the random access response message. In still other examples, the method further includes transmitting the total number of retransmissions and the fixed time gap between each of the retransmissions to the scheduled entity within a license-assisted channel.

In some aspects of the disclosure, the method further includes measuring a signal strength of the random access preamble message, and determining the total number of retransmissions of the random access response message based on the signal strength.

In some aspects of the disclosure, the method further includes receiving the total number of retransmissions from the scheduled entity. In some examples, the method further includes receiving the total number of retransmissions in the random access preamble message. In other examples, the method further includes receiving the total number of retransmissions from the scheduled entity over a license-assisted channel. In some aspects of the disclosure, the method further includes transmitting a synchronization subframe to the scheduled entity for use by the scheduled entity in determining a signal strength of a signal within the synchronization subframe. The scheduled entity may determine the total number of retransmissions based on the signal strength.

In another aspect of the disclosure, a method of wireless communication between a scheduling entity and a scheduled entity in a wireless communication network is disclosed. The method includes transmitting a random access preamble message from the scheduled entity to the scheduling entity, receiving a random access response message at the scheduled entity from the scheduling entity in response to receiving the random access preamble message, and receiving one or more retransmissions of the random access response message at the scheduled entity from the scheduling entity.

In some aspects of the disclosure, the method further includes receiving a synchronization subframe at the scheduled entity from the scheduling entity, measuring a signal strength of a signal within the synchronization subframe, determining a total number of retransmissions of the random access response message based on the signal strength, and transmitting the total number of retransmissions from the scheduled entity to the scheduling entity. In some aspects of the disclosure, the method further includes transmitting the total number of retransmissions within the random access preamble message or within a license-assisted channel.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
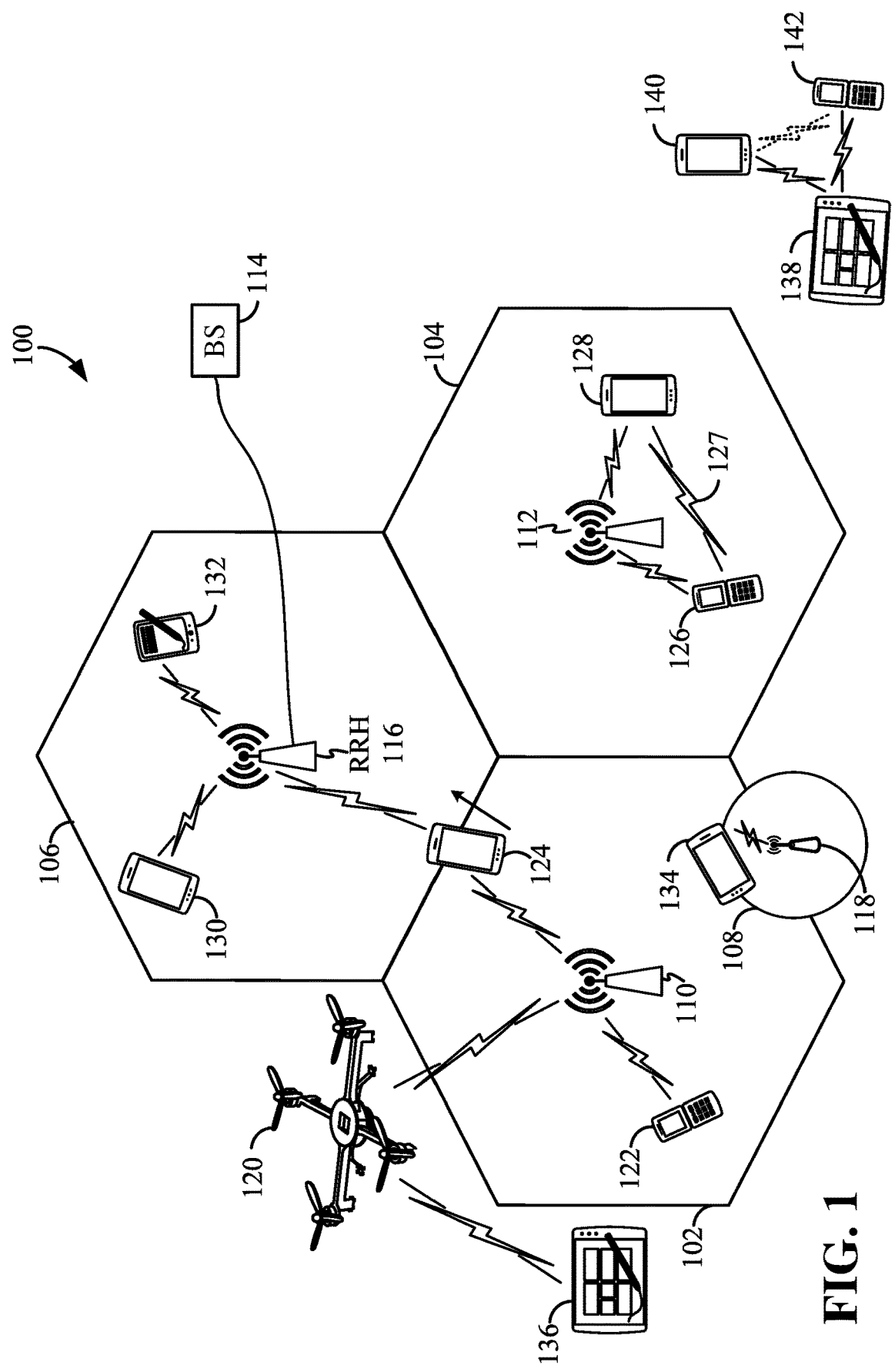
FIG. 1 is a diagram illustrating an example of an access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The access network 100 may be a next generation (e.g., fifth generation (5G)) access network or a legacy (e.g., 3G or 4G) access network. In addition, one or more nodes in the access network 100 may be next generation nodes or legacy nodes.

As used herein, the term legacy access network refers to a network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network generally refers to a network employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum (www.vstgf) and Korea Telecom SIG (www.kt5g.org).

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a GNodeB or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links.

This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quad-copter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or user data traffic from a base station (e.g., base station 110) to one or more UEs (e.g., UEs 122 and 124) may be referred to as downlink (DL) transmission, while transmissions of control information and/or user data traffic originating at a UE (e.g., UE 122) may be referred to as uplink (UL) transmissions. In addition, the uplink and/or downlink control information and/or user data traffic may be transmitted in slots, which may each include a certain number of symbols of variable duration. For example, the symbol duration may vary based on the cyclic prefix (e.g., normal or extended) and the numerology (e.g., sub-carrier spacing) of the symbol. In some examples, a slot may include one or more mini-slots, which may refer to an encapsulated set of information capable of being independently decoded. One or more slots may be grouped together into a subframe. In addition, multiple subframes may be grouped together to form a single frame or radio frame. Any suitable number of subframes may occupy a frame. In addition, a subframe may have any suitable duration (e.g., 250 s, 500 µs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
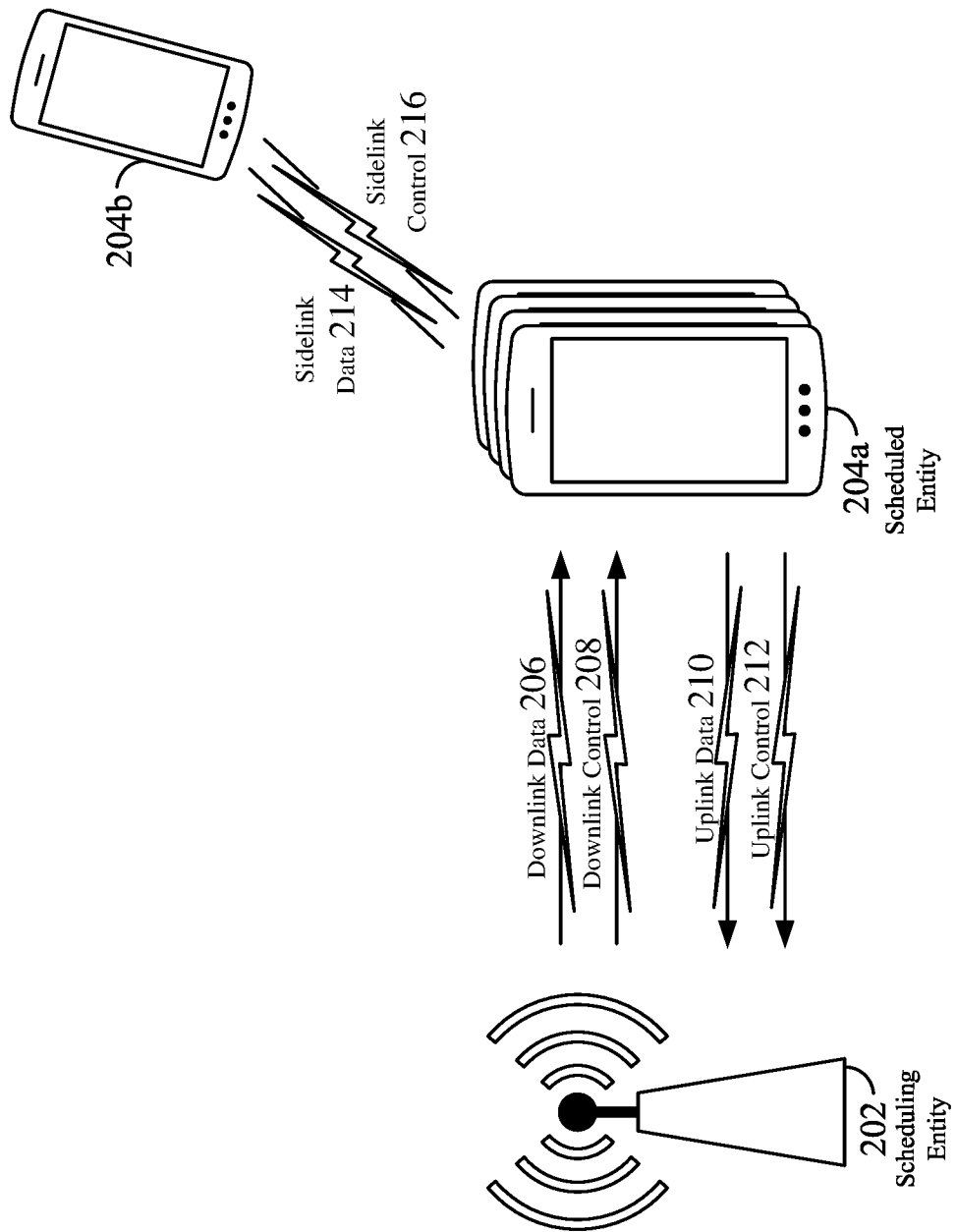
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast user data traffic 206 to one or more scheduled entities 204 (the user data traffic may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling user data traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and user data traffic information may be organized by subdividing a carrier, in time, into suitable slots.

Furthermore, the scheduled entities 204 may transmit uplink control information 212 including one or more uplink control channels (e.g., the physical uplink control channel (PUCCH)) to the scheduling entity 202. Uplink control information (UCI) transmitted within the PUCCH may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel, the scheduling entity 202 may transmit downlink control information 208 that may schedule the slot for uplink packet transmissions.

Uplink and downlink transmissions may generally utilize a suitable error correcting block code. In a typical block code, an information message or sequence is split up into information blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, Walsh codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
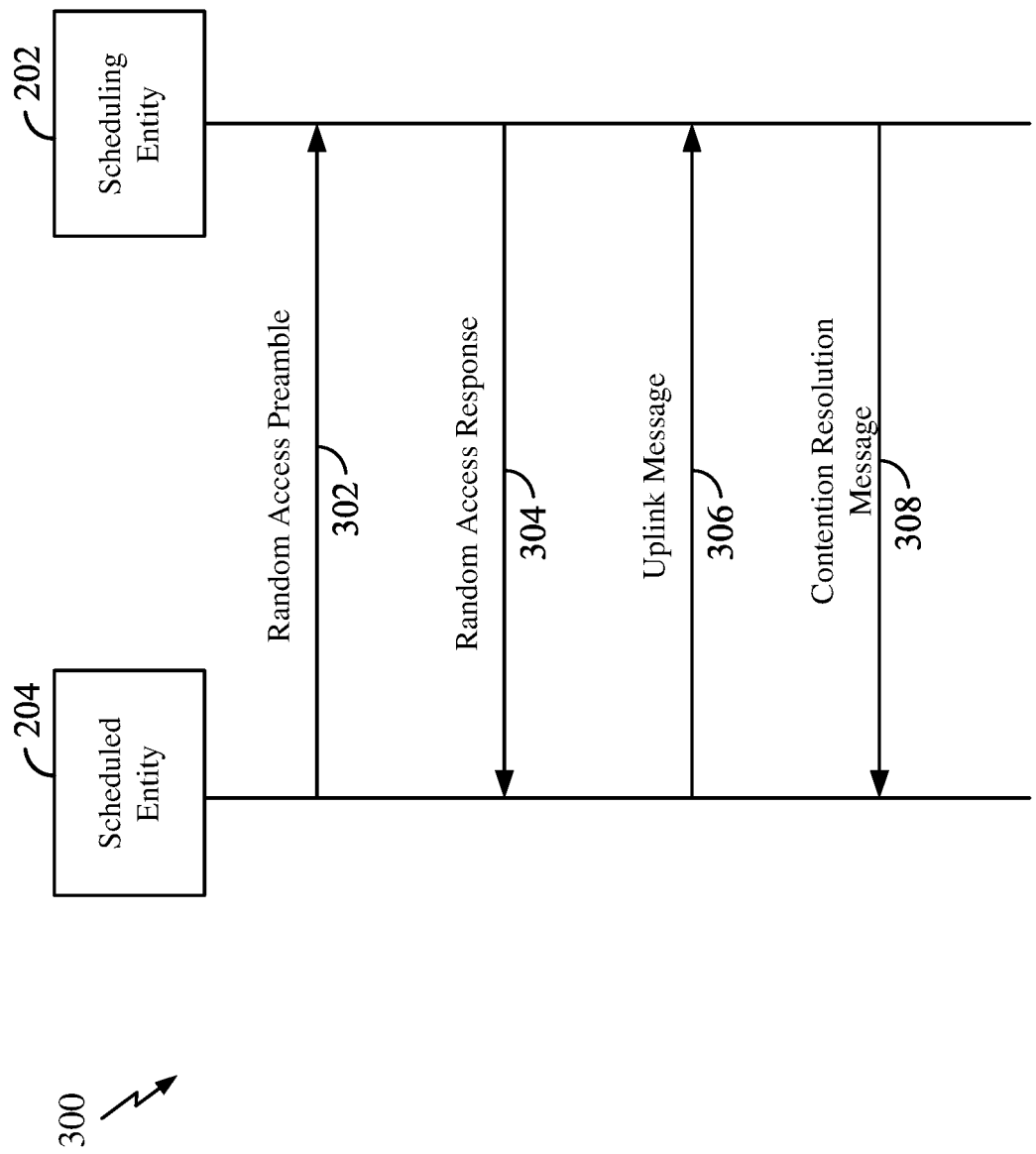
FIG. 3 is a diagram illustrating an example of a contention based random access procedure according to some embodiments.

One example of an uplink control channel is the Random Access Channel (RACH). The RACH may be used, for example, in a random access procedure during initial access of the uplink. FIG. 3 is a diagram illustrating an example of a contention based random access procedure 300 according to some embodiments. The random access procedure 300 shown in FIG. 3 is initiated by the scheduled entity 204 randomly selecting a preamble from an available set of preambles within the cell served by the scheduling entity 202, and transmitting the selected preamble to the scheduling entity 202 in a RACH preamble message 302. In an example, the scheduled entity 204 may select from 64 possible preamble sequences for inclusion in the RACH preamble message 302.

If the preamble is successfully detected by the scheduling entity 202, the scheduling entity 202 transmits a random access response (RAR) message 304 to the scheduled entity 204 on the physical downlink control channel (PDCCH). The RAR message 304 includes an identifier of the preamble sent by the scheduled entity 204, a Timing Advance (TA), a temporary cell radio network temporary identifier (TC-RNTI) or random access (RA) RNTI for the scheduled entity 204 and a grant of assigned uplink resources. Upon receipt of the RAR message 304, the scheduled entity 204 compares the preamble ID to the preamble sent by the scheduled entity in the RACH preamble message 302. If the preamble ID matches the preamble sent in the RACH preamble message 302, the scheduled entity 204 applies the timing advance and starts a contention resolution procedure.

Since the preamble is selected randomly by the scheduled entity, if another scheduled entity selects the same preamble in the same RACH resource, a collision may result between the two scheduled entities. Any collisions may then be resolved using the contention resolution procedure. During contention resolution, the scheduled entity 204 transmits an uplink message 306 on the common control channel (CCCH) using the TA and assigned uplink resources. In an example, the uplink message 306 is a Layer 2/Layer 3 (L2/L3) message, such as a Radio Resource Control (RRC) Connection Request message. The uplink message 306 includes an identifier of the scheduled entity 204 for use by the scheduling entity in resolving any collisions. Although other scheduled entities may transmit colliding uplink messages utilizing the TA and assigned uplink resources, these colliding uplink messages will likely not be successfully decoded at the scheduling entity since the colliding uplink messages were transmitted with TAs that were not intended for those scheduled entities.

Upon successfully decoding the uplink message, the scheduling entity 202 transmits a contention resolution message 308 to the scheduled entity 204. The contention resolution message 308 may be, for example, an RRC-Connection Setup message. In addition, the contention resolution message 308 includes the identifier of the scheduled entity 204 that was received in the uplink message 306. The scheduled entity 204, upon receiving its own identity back in the contention resolution message 308, concludes that the random access procedure was successful and completes the RRC connection setup process. Any other scheduled entity receiving the RRC-Connection Setup message 308 with the identity of the scheduled entity 204 will conclude that the random access procedure failed and re-initialize the random access procedure.

However, if the scheduled entity 204 is unable to properly decode the random access response message 304, the scheduled entity 204 may need to re-initialize the random access procedure 300, delaying further uplink transmissions by the scheduled entity 204. Similarly, if the scheduling entity 202 is unable to properly decode the uplink message 306, the scheduled entity may time-out waiting for the contention resolution message 308, thus requiring the scheduled entity 204 to re-initialize the random access procedure.

In various aspects of the disclosure, the scheduling entity 202 may retransmit the random access response (RAR) message 304 to the scheduled entity 204 one or more times to minimize delays in the random access procedure. In an example, the scheduling entity 202 may retransmit the RAR message 304 to the scheduled entity 204 if the scheduling entity 202 does not receive the uplink message 306 from the scheduled entity 204 within a monitoring window. In another example, the scheduling entity 202 may retransmit the RAR message 304 to the scheduled entity 204 if the scheduling entity 202 receives the uplink message 306, but is unable to successfully decode the uplink message 306 (e.g., an error checking mechanism such as a checksum or cyclic redundancy check fails).

In other examples, the scheduling entity 202 may automatically retransmit the RAR message 304 a multiple (N) number of times with a fixed time gap (e.g., corresponding to one or more slots, subframes, frames or other duration of time) between each retransmission. The number of retransmissions N may be determined, for example, based on the signal strength of the RACH preamble message 302 (e.g., a lower signal strength may result in more retransmissions than a higher signal strength). In an example, the scheduling entity 202 may inform the scheduled entity 204 of the number of retransmissions N and the fixed time gap between each retransmission within the initial RAR message 304. In this example, the RAR message information may be split between two code words, and each code word may include the number of retransmissions for redundancy purposes. In another example, the scheduling entity 202 may broadcast the number of retransmissions N and the fixed time gap between each of the retransmissions over a synchronization channel, such as the physical broadcast channel (PBCH). The PBCH typically carries the Master Information Block (MIB), which contains various system parameters, such as the channel bandwidth, and is received by the scheduled entity during initial acquisition prior to performing the random access procedure shown in FIG. 3. It is to be understood that the PBCH is merely one example provided here for illustrative purposes, and any suitable synchronization channel or broadcast channel may carry this information within the scope of the present disclosure. In another example, the scheduling entity 202 may inform the number of retransmissions N and the fixed time gap between each of the retransmissions over a license-assisted channel. The license-assisted channel may be a legacy (4G) channel or a 5G sub 6 GHz channel.

The scheduling entity 202 may alternatively receive the number of retransmissions N from the scheduled entity 204. The scheduled entity 204 may determine the number of retransmissions N, for example, based on the signal strength of a received reference/synchronization signal, such as the PBCH, primary synchronization signal (P-SCH), secondary synchronization signal (S-SCH) or beam reference signal. For example, the scheduled entity may indicate that more retransmissions are needed when the signal strength is low than if the signal strength is high. In an example, the scheduled entity may select the best beam that was transmitted from the scheduling entity during a synchronization subframe and use the signal strength of the beam reference signal corresponding to that beam in the synchronization subframe to determine the number of retransmissions. In an example, the scheduled entity 204 may inform the scheduling entity 202 of the number of retransmissions N within the RACH preamble message 302. In this example, each preamble sequence may be increased by one or more bits to indicate the requested number of retransmissions. In another example, the scheduled entity 204 may inform the scheduling entity 202 of the number of retransmissions N in a license-assisted channel, such as a legacy (4G) channel or a 5G sub 6 GHz channel.

Figure 4:
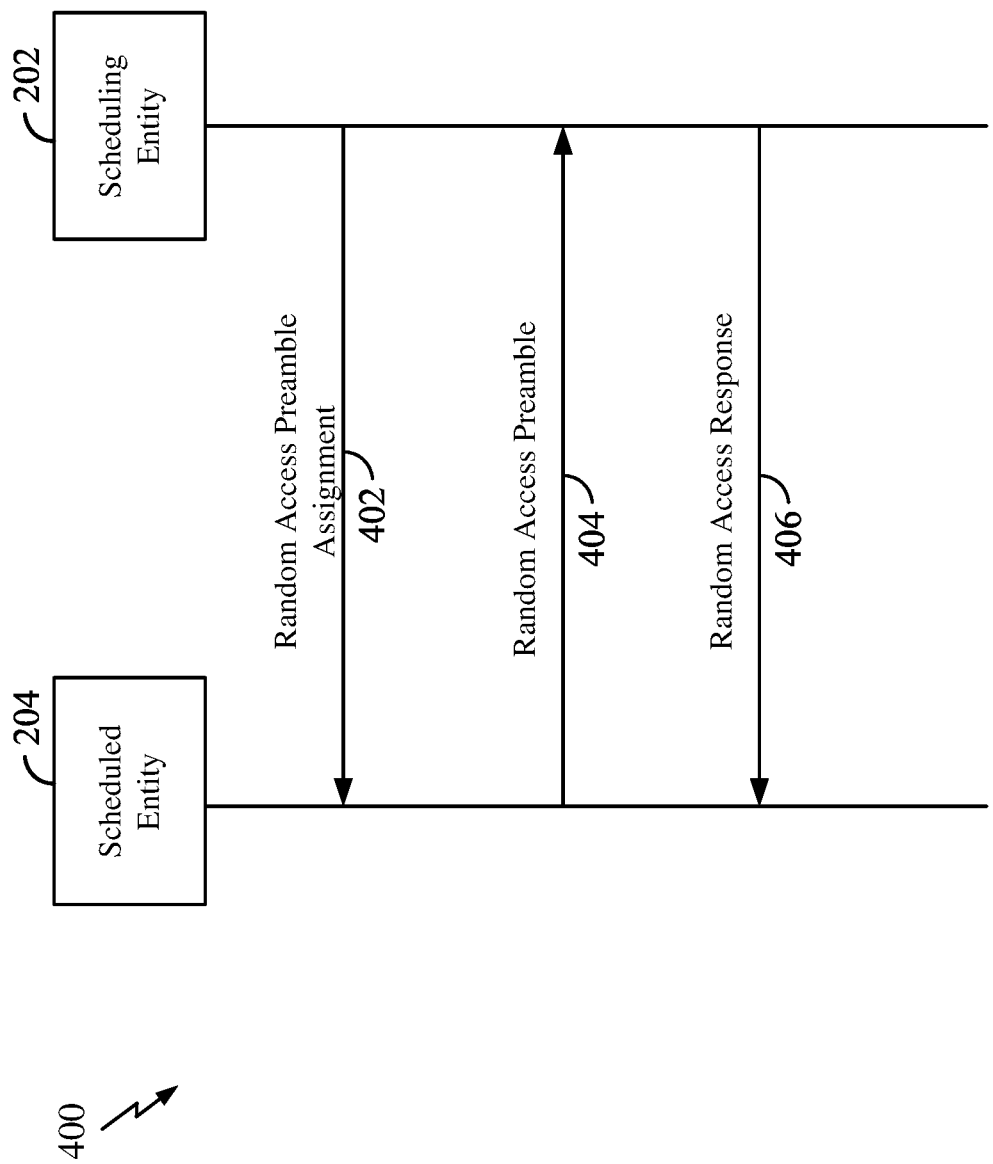
FIG. 4 is a diagram illustrating an example of a non-contention based random access procedure according to some embodiments.

FIG. 4 is a diagram illustrating an example of a non-contention based random access procedure according to some embodiments. The non-contention based random access procedure 400 may be used, for example, during handovers, after uplink synchronization loss or positioning of the scheduled entity. The non-contention based random access procedure is initiated by the scheduling entity 202 selecting a preamble from a reserved set of preambles within the cell served by the scheduling entity 202, and transmitting the selected preamble to the scheduled entity 204 in a RACH preamble assignment message 402. In an example, the reserved set of preambles may be separate from the pool of preambles available for random selection in contention based random access. Thus, the reserved set of preambles may be assigned by the scheduling entity in a contention-free manner.

The scheduled entity 204 may then transmit the assigned preamble to the scheduling entity 202 in a RACH preamble message 404. The scheduling entity 202 then transmits a random access response (RAR) message 406 on the physical downlink control channel (PDCCH). The RAR message 406 includes an identifier of the preamble sent by the scheduled entity 204, a Timing Advance (TA), a temporary cell radio network temporary identifier (TC-RNTI) or random access (RA) RNTI for the scheduled entity 204 and a grant of assigned uplink resources. Upon receipt of the RAR message 406, the scheduled entity 204 applies the timing advance and may initiate an uplink transmission using the assigned uplink resources.

In legacy (e.g., 3G and/or 4G) networks, the uplink utilizes a synchronous HARQ mechanism in which retransmissions are scheduled at fixed time intervals. For example, in frequency division duplex (FDD) Long Term Evolution (LTE), there are typically eight uplink HARQ processes operating in parallel and each HARQ process is assigned to a specific subframe in sequential order such that if a packet is transmitted in subframe 0, a retransmission of that packet may not occur until subframe 8. Utilizing only 8 HARQ processes for FDD LTE imposes some time constraints on the scheduling and scheduled entities. For example, since the uplink transmission typically requires approximately 1 ms (corresponding to 1 subframe), the scheduling entity has three subframes to decode the transmission, check the Cyclic Redundancy Code (CRC) and encode the ACK/NACK, so that the ACK/NACK can be transmitted back to the scheduled entity during the fourth subframe. The scheduled entity then has three subframes to decode the ACK/NACK and construct the next packet for that HARQ process based on the ACK/NACK (e.g., a new packet if an ACK is received and a retransmission of the same packet if a NACK is received). These time constraints may not be able to be met in time division duplex (TDD) LTE, and as such, TDD LTE typically includes more HARQ process IDs (e.g., up to 16 HARQ process IDs) based on the TDD configuration.

Each HARQ process has a unique HARQ process identifier (ID) associated therewith (e.g., HARQ Process IDs 0, 1, 2 . . . 7) that identifies a respective stop and wait (SAW) parallel process running on the scheduling entity. However, for synchronous HARQ, the HARQ process ID does not need to be transmitted from the scheduling entity with the uplink grant or from the scheduled entity with the uplink transmission since both the scheduling entity and scheduled entity have knowledge of the number of HARQ processes and the sequential order of HARQ processes (e.g., starting with HARQ process 0 and increasing with each subframe until HARQ process 7 is reached, then repeating).

However, next generation (e.g., 5G) networks may utilize asynchronous HARQ on the uplink. Asynchronous HARQ allows the scheduling entity to select any available HARQ process for a transmission or retransmission, thus providing more flexibility. However, asynchronous HARQ requires the scheduling entity to transmit the HARQ process ID in the scheduling information.

Although the random access procedure enables an uplink grant to be included in RAR messages, legacy networks do not provide for the inclusion of a HARQ process ID corresponding to the uplink grant in RAR messages. Therefore, in various aspects of the disclosure, to accommodate asynchronous HARQ on the uplink in next generation networks, the RAR message of contention-based and/or non-contention based random access may further include the HARQ process ID with the grant of uplink resources.

Figure 5:
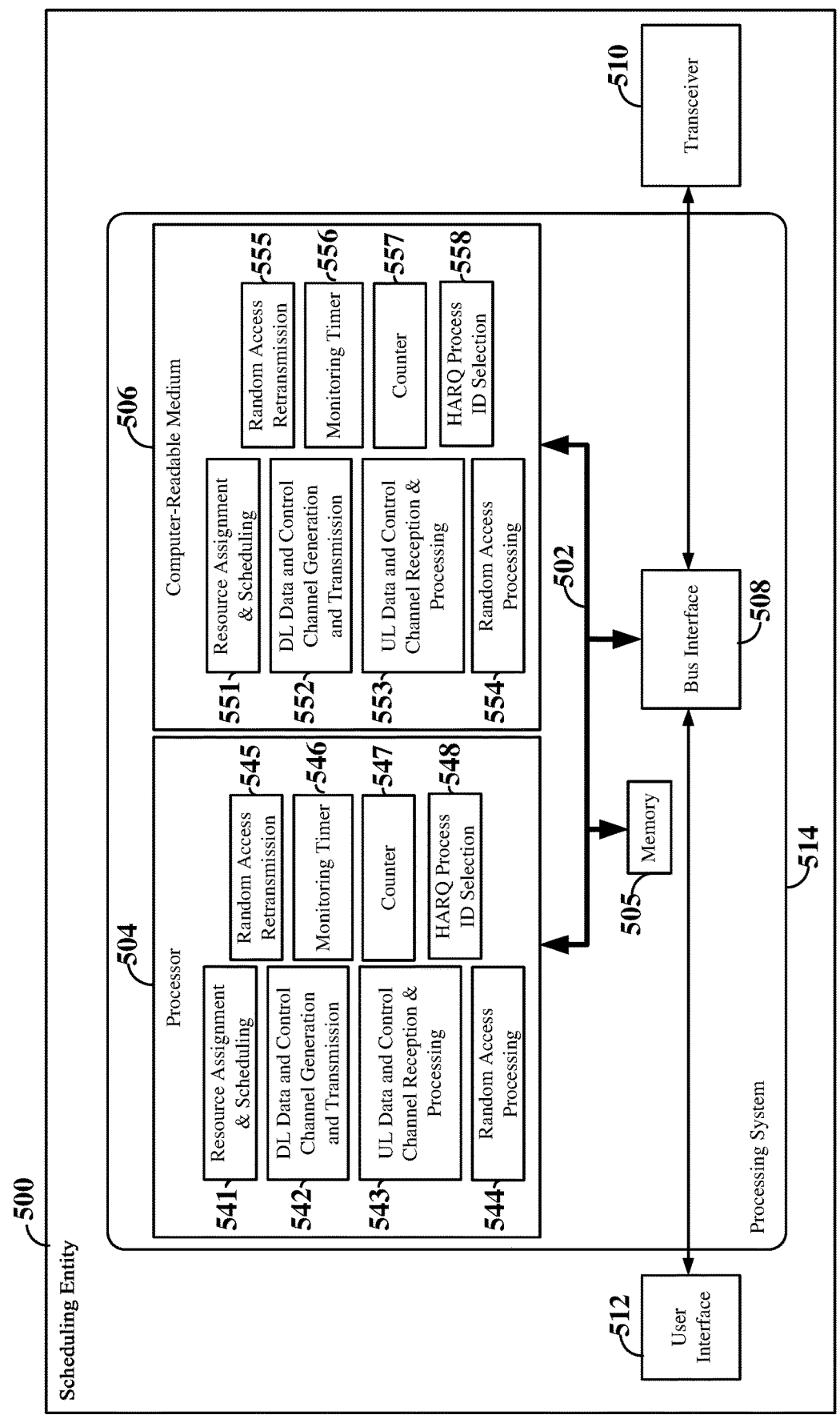
FIG. 5 is a block diagram illustrating an example of a hardware implementation for a scheduling entity employing a processing system according to some embodiments.

FIG. 5 is a conceptual diagram illustrating an example of a hardware implementation for an exemplary scheduling entity 500 employing a processing system 514. For example, the scheduling entity 500 may be a user equipment (UE) as illustrated in any one or more of FIGS. 1-4. In another example, the scheduling entity 500 may be a base station as illustrated in any one or more of FIGS. 1-4. For example, the scheduling entity 500 may be a next generation (5G) scheduling entity serving a macro or small cell.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes described below and illustrated in FIGS. 7 and 8.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

In some aspects of the disclosure, the processor 504 may include circuitry configured for various functions. For example, the processor 504 may include resource assignment and scheduling circuitry 541, configured to generate, schedule, and modify a resource assignment or grant of time-frequency resources. For example, the resource assignment and scheduling circuitry 541 may generate one or more time division duplex (TDD) slots or subframes, each including time-frequency resources assigned to carry data and/or control information to and/or from multiple scheduled entities. The resource assignment and scheduling circuitry 541 may operate in coordination with resource assignment and scheduling software 551.

The processor 504 may further include downlink (DL) data and control channel generation and transmission circuitry 542, configured to generate and transmit downlink data and control channels. The DL data and control channel generation and transmission circuitry 542 may operate in coordination with the resource assignment and scheduling circuitry 541 to schedule the DL data and/or control information and to place the DL data and/or control information onto a time division duplex (TDD) or frequency division duplex (FDD) carrier within one or more subframes generated by the resource assignment and scheduling circuitry 541 in accordance with the resources assigned to the DL data and/or control information. The DL data and control channel generation and transmission circuitry 542 may further operate in coordination with DL data and control channel generation and transmission software 552.

The processor 504 may further include uplink (UL) data and control channel reception and processing circuitry 543, configured to receive and process uplink control channels and uplink data channels from one or more scheduled entities. In some examples, the UL data and control channel reception and processing circuitry 543 may be configured to receive scheduling requests from one or more scheduled entities, the scheduling requests being configured to request a grant of time-frequency resources for uplink user data transmissions. In other examples, the UL data and control channel reception and processing circuitry 543 may be configured to receive and process acknowledgement information (e.g., acknowledged/not acknowledged packets) from one or more scheduled entities. The UL data and control channel reception and processing circuitry 543 may operate in coordination with the resource assignment and scheduling circuitry 541 to schedule UL data transmissions, DL data transmissions and/or DL data retransmissions in accordance with the received UL control channel information. The UL data and control channel reception and processing circuitry 543 may further operate in coordination with UL data and control channel reception and processing software 553.

The processor 504 may further include random access processing circuitry 544, configured to perform contention and/or non-contention based random access procedures with scheduled entities. In some examples, the random access processing circuitry 544 may be configured to operate in coordination with the UL data and control channel reception and processing circuitry 543 to receive RACH preamble messages from scheduled entities. The random access processing circuitry 544 may further be configured to operate in coordination with the DL data and control channel generation and transmission circuitry 542 to generate random access response (RAR) messages to scheduled entities. Each RAR message may include, for example, an identifier of the preamble sent by the respective scheduled entity, a Timing Advance (TA), a temporary cell radio network temporary identifier (TC-RNTI) or random access (RA) RNTI for the respective scheduled entity and a grant of assigned uplink resources.

For contention-based random access, the random access processing circuitry 544 may further be configured to perform contention resolution. For example, during contention resolution, the random access processing circuitry 544 may be configured to operate in coordination with the UL data and control channel reception and processing circuitry 543 to receive uplink L2/L3 messages from scheduled entities. The uplink L2/L3 messages may utilize the respective TA and assigned uplink resources provided in the RAR messages and include respective identifiers of the respective scheduled entities. Upon successfully decoding the uplink L2/L3 messages, the random access processing circuitry 544 may further be configured to operate in coordination with the DL data and control channel generation and transmission circuitry 542 to transmit contention resolution response messages to the scheduled entities to synchronize the uplink timing with the scheduled entities. Each contention resolution message includes the respective identifier of the respective scheduled entity received in the respective uplink L2/L3 message. The random access processing circuitry 544 may further operate in coordination with random access processing software 554.

The processor 504 may further include random access retransmission circuitry 545 configured to determine a number of retransmissions of the random access response (RAR) message to a scheduled entity during a random access procedure to minimize delays in the random access procedure. In an example, the number of retransmissions may be determined based on the receipt/decoding of the uplink L2/L3 message transmitted by the scheduled entity during the random access procedure. For example, the random access retransmission circuitry 545 may initialize a monitoring timer 546 upon transmission of the RAR message by the random access processing circuitry 544. The monitoring timer 546 may provide a monitoring window within which the random access retransmission circuitry 545 monitors for receipt by the random access processing circuitry 544 of the uplink L2/L3 message from the scheduled entity. If the monitoring timer 546 expires prior to receipt of the uplink L2/L3 message, the random access retransmission circuitry 545 operates in coordination with the random access processing circuitry 544 to retransmit the RAR message to the scheduled entity. This process may be repeated after each retransmission, if necessary.

In another example, if the random access processing circuitry 544 is unable to successfully decode the uplink L2/L3 message, the random access retransmission circuitry 545 may operate in coordination with the random access processing circuitry 544 to retransmit the RAR message to the scheduled entity. This process may be repeated after each retransmission, if necessary. Thus, in each of the above examples, the number of retransmissions is variable based on the successful receipt/decoding of the uplink L2/L3 message.

In other examples, the random access retransmission circuitry 545 may automatically retransmit the RAR message a multiple (N) number of times with a fixed time gap between each retransmission. The number of retransmissions may be determined, for example, based on the signal strength of the RACH preamble message received by the random access processing circuitry 544. In an example, the random access retransmission circuitry 545 may operate in coordination with the random access processing circuitry 544 and the DL data and control channel generation and transmission circuitry 542 to inform the scheduled entity of the number of retransmissions and the fixed time gap between each retransmission within the initial RAR message. In this example, the RAR message information may be split between two code words and each code word may include the number of retransmissions for redundancy purposes.

The random access retransmission circuitry 545 may further operate in coordination with the random access processing circuitry 544 and the DL data and control channel generation and transmission circuitry 542 to indicate, within the initial RAR subframe, the number of subframes to be used to transmit the initial RAR message (e.g., including or excluding the initial RAR subframe) and/or the number of subframes to be used to transmit the N retransmitted RAR messages. In some examples, the random access retransmission circuitry 545 may indicate the total number of subframes to be used to transmit the N retransmitted RAR messages and/or the number of subframes to be used to transmit each retransmitted RAR message.

In another example, the random access retransmission circuitry 545 may operate in coordination with the DL data and control channel generation and transmission circuitry 542 to broadcast the number of retransmissions and the fixed time gap between each of the retransmissions over a synchronization channel, such as the physical broadcast channel (PBCH), prior to the random access processing circuitry 544 receiving a RACH preamble message from the scheduled entity. In some examples, the broadcasted information may further indicate the number of subframes to be used for the initial RAR message and/or the number of subframes to be used for the N retransmitted RAR messages.

The random access retransmission circuitry 545 may further receive the number (N) of retransmissions from the scheduled entity. In an example, the random access retransmission circuitry 545 may operate in coordination with the random access processing circuitry 544 to receive the number of retransmissions within the RACH preamble message. In another example, the random access retransmission circuitry 545 may operate in coordination with the UL data and control channel reception and processing circuitry 543 to receive the number of retransmissions in a license-assisted channel, such as a legacy (4G) channel or a 5G sub 6 GHz channel.

In addition, to implement the N retransmissions, the random access retransmission circuitry 545 may initialize a counter 547 with the value N upon transmitting the initial RAR message and decrement the counter by one at each retransmission. When the counter reaches zero, the random access retransmission circuitry 545 may discontinue retransmissions of the RAR message to the scheduled entity. The random access retransmission circuitry 545 may further operate in coordination with random access retransmission software 555, monitoring timer software 556 and counter software 557.

The processor 504 may further include HARQ process ID selection circuitry 548, configured to select a HARQ process ID when operating in asynchronous HARQ mode. The HARQ process ID selection circuitry may select an available HARQ process ID for a downlink transmission or an uplink transmission from a plurality of HARQ process IDs. The number of HARQ process IDs is configurable, and may be determined, for example, based on the type of duplexing (e.g., TDD or FDD), the subframe structure and other factors. Each HARQ process ID identifies a respective stop and wait (SAW) parallel process running on the scheduling entity. The HARQ process ID selection circuitry 548 may further provide the selected HARQ process ID to the DL data and control channel generation and transmission circuitry 542 for inclusion with scheduling information transmitted on a downlink control channel. The scheduling information may indicate an assignment of time-frequency resources for a downlink transmission, together with the selected HARQ process ID for the downlink transmission, or a grant of time-frequency resources for an uplink transmission, together with the selected HARQ process ID for the uplink transmission.

The HARQ process ID selection circuitry 548 may further operate in coordination with the random access processing circuitry 544 to select a HARQ process ID to be included with an uplink grant in a random access response message. In addition, the HARQ process ID selection circuitry 548 may operate in coordination with the random access retransmission circuitry 545 and random access processing circuitry 544 to select and include the HARQ process ID with the uplink grant in retransmitted random access response messages. In some examples, the HARQ process ID included in the retransmitted random access response messages is the same as the HARQ process ID included in the original random access response message. In other examples, the HARQ process ID may vary between retransmissions.

For non-contention-based random access, the scheduled entity may include the HARQ process ID received in the random access response message in the subsequent uplink transmission sent based on the uplink grant. Thus, the UL data and control channel reception and processing circuitry 543 may associate the received uplink transmission with the indicated HARQ process ID to perform HARQ processing on the uplink transmission.

For contention based random access, the HARQ process ID is not needed in the L2/L3 uplink contention message, since HARQ processing is not performed on the L2/L3 uplink contention message. Thus, in some examples, the HARQ process ID selection circuitry 548 may not select a HARQ process ID for an uplink grant in a contention based random access response message, and therefore, the random access response message in contention-based random access may not include a HARQ process ID. However, in other examples, the HARQ process ID selection circuitry 548 may select a HARQ process ID for inclusion in a contention based random access response message to provide uniformity in random access response messages between contention and non-contention based random access procedures. In this example, N bits in the random access response message are reserved for the HARQ process ID in both contention and non-contention based random access procedures. However, the scheduled entity may ignore the N bits containing the HARQ process ID in contention based random access response messages.

Thus, the HARQ process ID selection circuitry 548 determines whether to include a HARQ process ID within a random access response message based at least on the type of random access procedure (e.g., contention or non-contention) being used by the scheduled entity. The HARQ process ID selection circuitry 548 may further operate in coordination with HARQ process ID selection software 558.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 6:
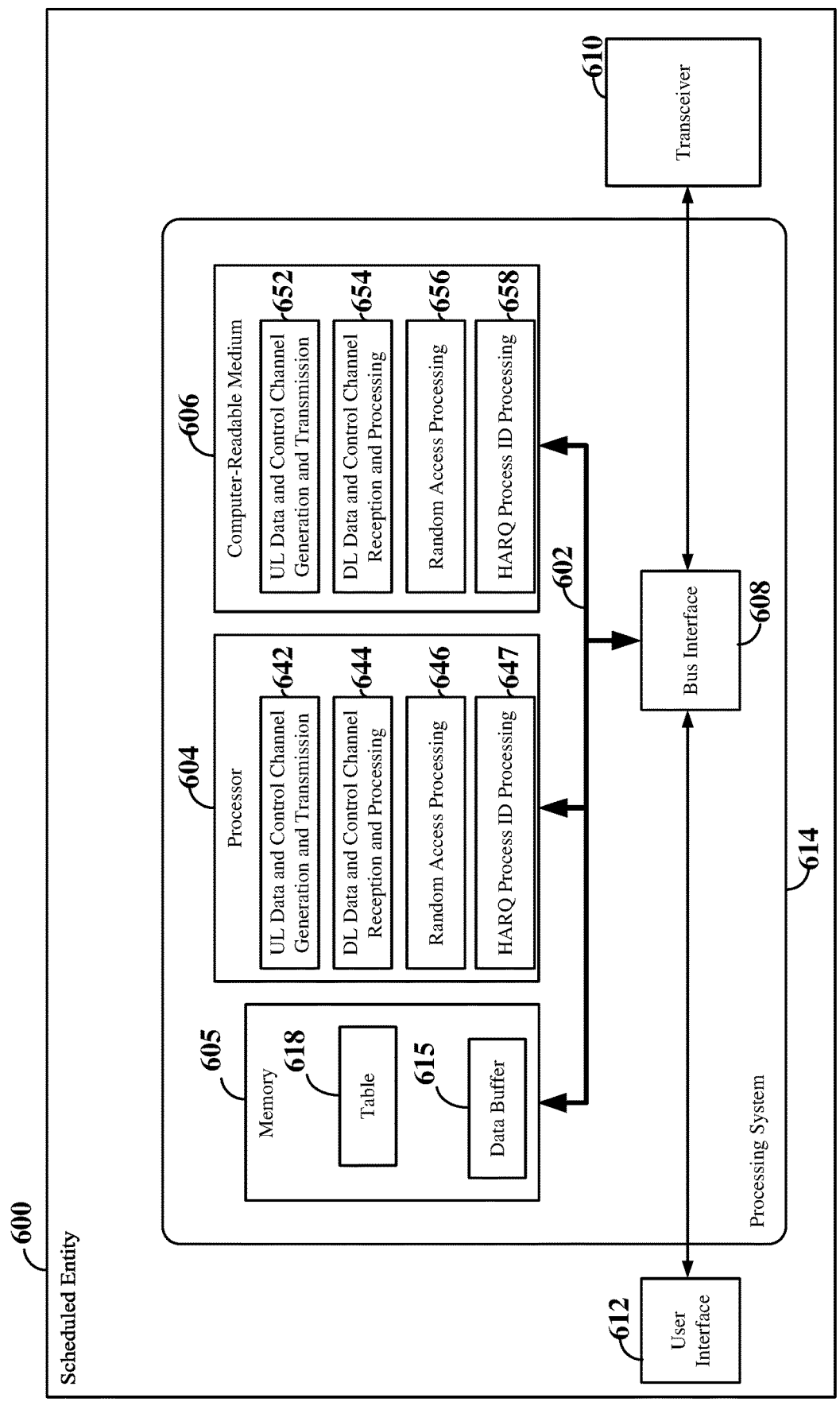
FIG. 6 is a block diagram illustrating an example of a hardware implementation for a scheduled entity employing a processing system according to some embodiments.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a user equipment (UE) as illustrated in any one or more of FIGS. 1-4.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below.

In some aspects of the disclosure, the processor 604 may include uplink (UL) data and control channel generation and transmission circuitry 642, configured to generate and transmit uplink data on an UL data channel, and to generate and transmit uplink control/feedback/acknowledgement information on an UL control channel. The UL data and control channel generation and transmission circuitry 642 may operate in coordination with UL data and control channel generation and transmission software 652. The processor 604 may further include downlink (DL) data and control channel reception and processing circuitry 644, configured for receiving and processing downlink data on a data channel, and to receive and process control information on one or more downlink control channels. In some examples, received downlink data and/or control information may be temporarily stored in a data buffer 615 within memory 605. The DL data and control channel reception and processing circuitry 644 may operate in coordination with DL data and control channel reception and processing software 654.

The processor 604 may further include random access processing circuitry 646, configured to perform a random access procedure with a scheduling entity. In some examples, the random access processing circuitry 646 may be configured to operate in coordination with the UL data and control channel generation and transmission circuitry 642 to select a RACH preamble and to transmit a RACH preamble message to the scheduling entity. The random access processing circuitry 646 may further be configured to operate in coordination with the DL data and control channel reception and processing circuitry 644 to receive a random access response (RAR) message from the scheduling entity. The RAR message may include, for example, an identifier of the preamble sent by the scheduled entity 600, a Timing Advance (TA), a temporary cell radio network temporary identifier (TC-RNTI) or random access (RA) RNTI for the scheduled entity 600 and a grant of assigned uplink resources.

The random access processing circuitry 646 may further be configured to perform contention resolution. For example, during contention resolution, the random access processing circuitry 646 may be configured to operate in coordination with the UL data and control channel generation and transmission circuitry 642 to transmit an uplink L2/L3 message to the scheduling entity. The uplink L2/L3 message utilizes the TA and assigned uplink resources provided in the RAR message and includes an identifier of the scheduled entity 600. The random access processing circuitry 646 may further be configured to operate in coordination with the DL data and control channel reception and processing circuitry 644 to receive a contention resolution message from the scheduling entity. The contention resolution message may include, for example, the identifier of the scheduled entity transmitted in the uplink L2/L3 message.

The random access processing circuitry 646 may further be configured to operate in coordination with the DL data and control channel reception and processing circuitry 644 to receive one or more retransmissions of the RAR message. In an example, the random access processing circuitry 646 may receive a retransmitted RAR message without prior notice. In another example, the random access processing circuitry 646 may receive an expected number of retransmissions and/or expected number of subframes for the retransmissions, along with a fixed time gap between the retransmissions, from the scheduling entity within the initial RAR message or over a synchronization channel prior to initializing the random access procedure. The random access processing circuitry 646 may then wait for a retransmitted RAR message if the random access processing circuitry 646 is unable to successfully decode the initial RAR message.

The random access processing circuitry 646 may further be configured to determine the number of retransmissions, for example, based on the signal strength of a received reference/synchronization signal, such as the PBCH, primary synchronization signal (P-SCH), secondary synchronization signal (S-SCH) or beam reference signal. For example, the DL data and control channel reception and processing circuitry 644 may select the best beam transmitted during a synchronization subframe and measure the signal strength (e.g., signal-to-interference-plus-noise ratio (SINR)) of the selected beam. The scheduled entity 600 may further maintain a table 618 of signal strength ranges and corresponding numbers of retransmissions and index on the table 618 to identify the number of retransmissions to be utilized based on the measured signal strength. In some examples, the table 618 may be configured such that lower signal strengths require more retransmissions than higher signal strengths.

In an example, the random access processing circuitry 646 may operate in coordination with the UL data and control channel generation and transmission circuitry 642 to inform the scheduling entity of the number of retransmissions within the RACH preamble message. In this example, each preamble sequence may be increased by one or more bits to indicate the number of requested retransmissions. In another example, the random access processing circuitry 646 may operate in coordination with the UL data and control channel generation and transmission circuitry 642 to inform the scheduling entity of the number of retransmissions in a license-assisted channel, such as a legacy (4G) channel or a 5G sub 6 GHz channel. The random access processing circuitry 646 may further operate in coordination with random access processing software 656.

The processor 604 may further include HARQ process ID processing circuitry 647, configured to receive a HARQ process ID for a downlink assignment or an uplink grant when operating in asynchronous HARQ mode. In some examples, the HARQ process ID processing circuitry 647 utilizes the HARQ process ID received in a downlink assignment to perform HARQ on a received downlink transmission associated with the downlink assignment and further provides the HARQ process ID to the UL data and control channel generation and transmission circuitry 642 for inclusion in the subsequent ACK/NACK message transmitted to the scheduling entity. For uplink transmissions, the HARQ process ID processing circuitry 647 provides the HARQ process ID received with the uplink grant to the UL data and control channel generation and transmission circuitry 642 for inclusion in an uplink transmission associated with the uplink grant.

The HARQ process ID processing circuitry 647 may further operate in coordination with random access processing circuitry 646 to receive the HARQ process ID in a random access response message. The random access response message may be an original random access response message or a retransmitted random access response message. In some examples, the HARQ process ID included in the retransmitted random access response messages is the same as the HARQ process ID included in the original random access response message. In other examples, the HARQ process ID may vary between retransmissions.

For non-contention-based random access, the HARQ process ID processing circuitry 647 may provide the HARQ process ID received in the random access response message to the UL data and control channel generation and transmission circuitry 642 for inclusion of the HARQ process ID in the subsequent uplink transmission sent based on the uplink grant. For contention based random access, the HARQ process ID processing circuitry 647 may ignore any HARQ process ID received in a random access response message, since the HARQ process ID is not needed for the L2/L3 uplink contention message. The HARQ process ID processing circuitry 647 may further operate in coordination with HARQ process ID processing software 658.

Figure 7:
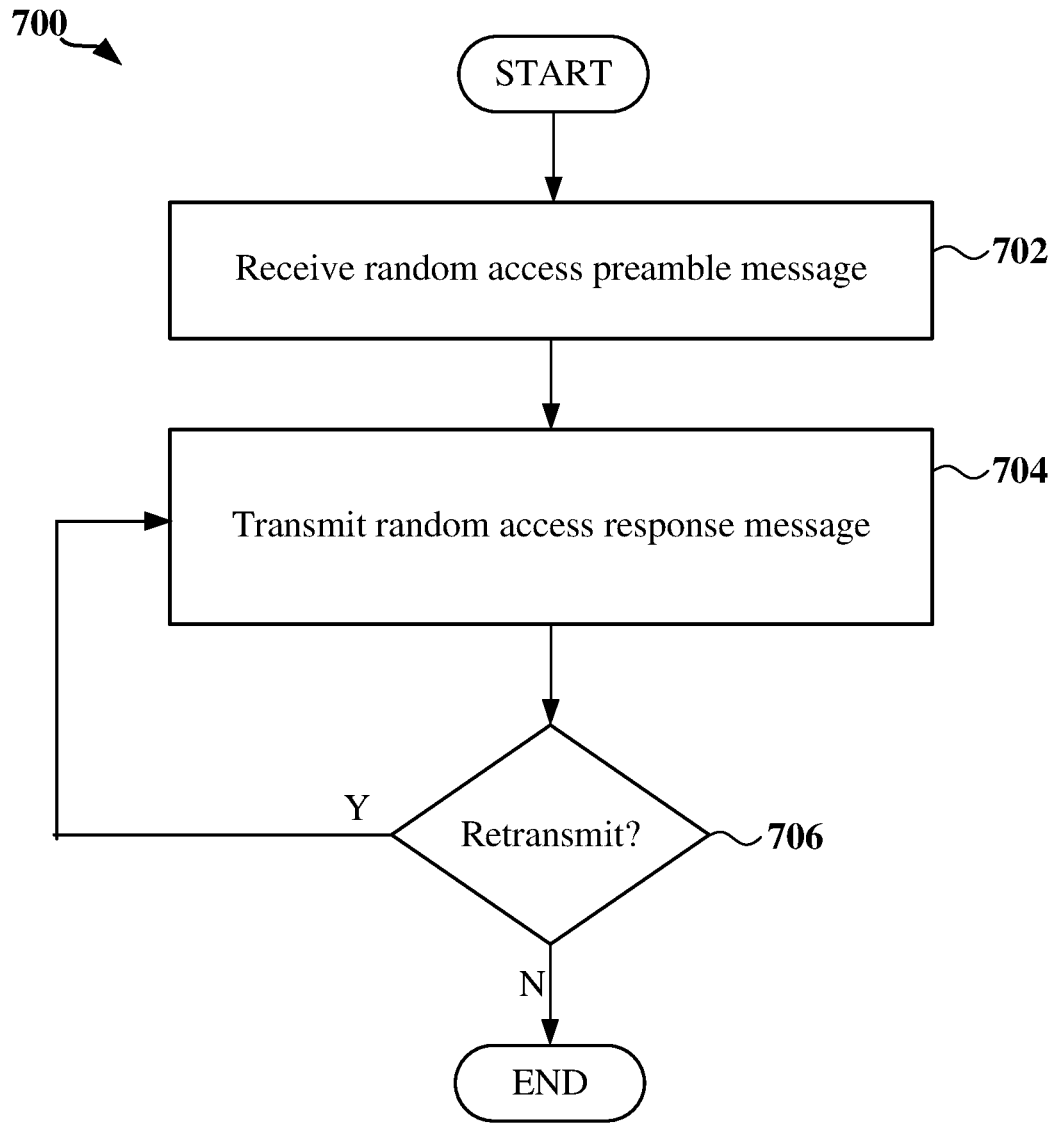
FIG. 7 is a flow chart of a method of wireless communication that provides a random access retransmission procedure.

FIG. 7 is a flow chart illustrating an exemplary process 700 for performing a random access procedure in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the scheduling entity 500 illustrated in FIG. 5. In some examples, the process 700 may be carried out by any suitable apparatus or means for carrying out the functions or algorithm described below.

At block 702, the scheduling entity may receive a random access preamble message from a scheduled entity. In some examples, the scheduled entity may randomly select a preamble from an available set of preambles within the cell served by the scheduling entity, and transmit the selected preamble to the scheduling entity in a random access channel (RACH) preamble message. In an example, the scheduled entity may select from 64 possible preamble sequences for inclusion in the RACH preamble message. For example, the random access processing circuitry 544 shown and described above in reference to FIG. 5 may receive the random access preamble message.

At block 704, the scheduling entity may transmit an initial random access response (RAR) message to the scheduled entity. In some examples, the scheduling entity may transmit the initial RAR message to the scheduled entity on the physical downlink control channel (PDCCH). The RAR message may include, for example, an identifier of the preamble sent by the scheduled entity, a Timing Advance (TA), a temporary cell radio network temporary identifier (TC-RNTI) or random access (RA) RNTI for the scheduled entity and a grant of assigned uplink resources. For example, the random access processing circuitry 544 shown and described above in reference to FIG. 5 may transmit the initial RAR message to the scheduled entity.

At block 706, the scheduling entity may determine whether the RAR message is to be retransmitted. For example, the scheduling entity may determine that the RAR message is to be retransmitted to the scheduled entity if the scheduling entity does not receive an uplink L2/L3 message from the scheduled entity within a monitoring window. As another example, the scheduling entity may determine that the RAR message is to be retransmitted to the scheduled entity if the scheduling entity receives the uplink L2/L3 message, but is unable to successfully decode the uplink L2/L3 message. As a further example, the scheduling entity may determine a fixed number (N) of retransmissions of the RAR message and then determine a remaining number of retransmissions of the fixed number of retransmissions. If the remaining number of retransmissions is greater than or equal to one, the scheduling entity may determine that the RAR message is to be retransmitted to the scheduled entity. The fixed number of retransmissions N may be determined, for example, based on the signal strength of a message (e.g., a random access preamble message) received from scheduled entity. The scheduling entity may alternatively receive the fixed number of retransmissions N from the scheduled entity. For example, the scheduling entity may receive the fixed number of retransmissions N from the scheduled entity within a random access preamble message or another license-assisted channel. For example, the random access retransmission circuitry 545 shown and described above in reference to FIG. 5 may determine whether the RAR message is to be retransmitted.

If the scheduling entity determines that the RAR message is to be retransmitted (Y branch of 704), the scheduling entity may repeat the transmission of the RAR message at block 704. In an example, if the RAR message is to be retransmitted (N) number of times, at each retransmission (e.g., repeat of block 704), a counter initialized with N may be decremented by one. When the counter reaches zero, the process ends. In another example, if the retransmission is based on whether the uplink L2/L3 message is received/decoded, the process ends when the uplink L2/L3 message is both received and successfully decoded. For example, the random access retransmission circuitry 545 shown and described above in reference to FIG. 5 may retransmit the RAR message.

Figure 8:
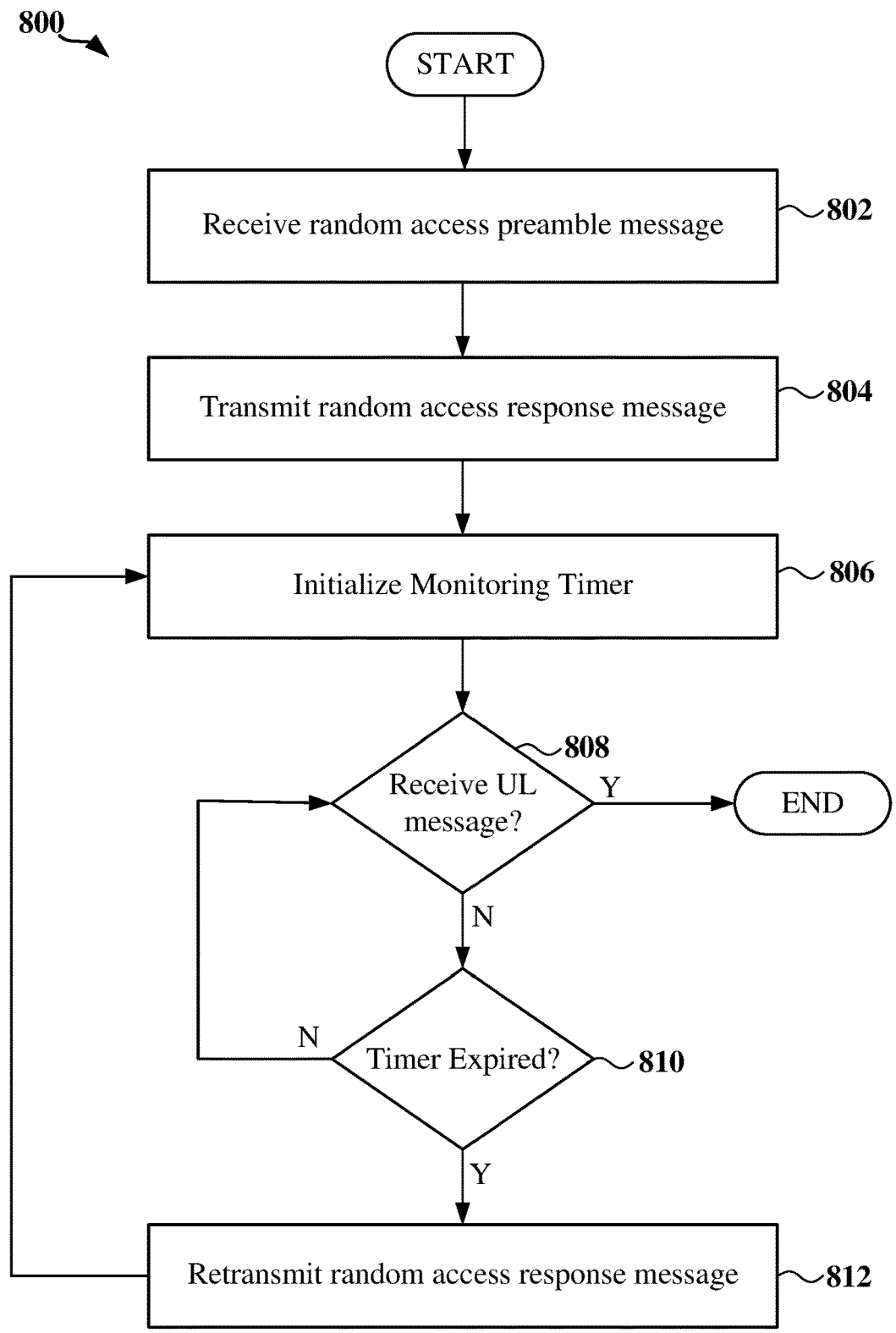
FIG. 8 is a flow chart of another method of wireless communication that provides a random access retransmission procedure.

FIG. 8 is a flow chart illustrating an exemplary process 800 for performing a random access procedure in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the scheduling entity 500 illustrated in FIG. 5. In some examples, the process 800 may be carried out by any suitable apparatus or means for carrying out the functions or algorithm described below.

At block 802, the scheduling entity may receive a random access preamble message from a scheduled entity. In some examples, the scheduled entity may randomly select a preamble from an available set of preambles within the cell served by the scheduling entity, and transmit the selected preamble to the scheduling entity in a random access channel (RACH) preamble message. In an example, the scheduled entity may select from 64 possible preamble sequences for inclusion in the RACH preamble message. For example, the random access processing circuitry 544 shown and described above in reference to FIG. 5 may receive the random access preamble message.

At block 804, the scheduling entity may transmit an initial random access response (RAR) message to the scheduled entity. In some examples, the scheduling entity may transmit the initial RAR message to the scheduled entity on the physical downlink control channel (PDCCH). The RAR message may include, for example, an identifier of the preamble sent by the scheduled entity, a Timing Advance (TA), a temporary cell radio network temporary identifier (TC-RNTI) or random access (RA) RNTI for the scheduled entity and a grant of assigned uplink resources. For example, the random access processing circuitry 544 shown and described above in reference to FIG. 5 may transmit the initial RAR message to the scheduled entity.

At block 806, the scheduling entity may initialize a monitoring timer. The monitoring timer may provide a monitoring window within which the scheduling entity monitors for receipt of an uplink L2/L3 message from the scheduled entity. For example, the random access processing circuitry 544 in combination with the random access retransmission circuitry 545 shown and described above in reference to FIG. 5 may initialize the monitoring timer.

At block 808, the scheduling entity may determine whether the uplink L2/L3 message has been received from the scheduled entity. If the uplink L2/L3 message has been received (Y branch of 808), the process may end. However, if the uplink L2/L3 message has not been received (N branch of 808), at block 810, the scheduling entity may determine whether the monitoring timer has expired. If the monitoring timer expires prior to receipt of the uplink L2/L3 message (Y branch of 810), the scheduling entity may retransmit the random access response message to the scheduled entity. For example, the random access retransmission circuitry 545 in combination with the random access processing circuitry 544 shown and described above in reference to FIG. 5 may determine whether the monitoring timer has expired prior to receipt of the uplink L2/L3 message, and if so, retransmit the RAR message to the scheduled entity. The process illustrated between block 806 and block 812 may be repeated after each retransmission, if necessary.

Figure 9:
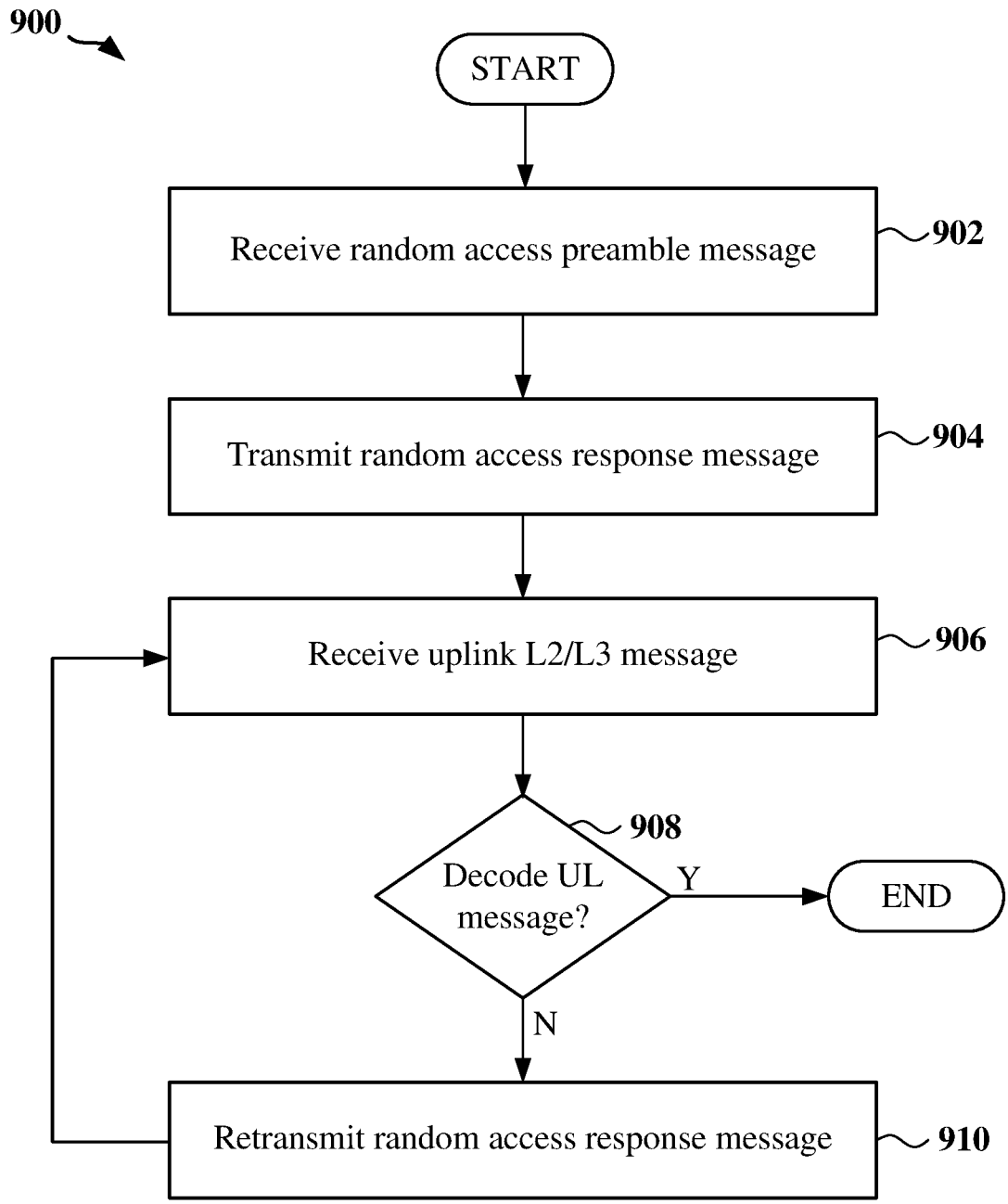
FIG. 9 is a flow chart of another method of wireless communication that provides a random access retransmission procedure.

FIG. 9 is a flow chart illustrating an exemplary process 900 for performing a random access procedure in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduling entity 500 illustrated in FIG. 5. In some examples, the process 900 may be carried out by any suitable apparatus or means for carrying out the functions or algorithm described below.

At block 902, the scheduling entity may receive a random access preamble message from a scheduled entity. In some examples, the scheduled entity may randomly select a preamble from an available set of preambles within the cell served by the scheduling entity, and transmit the selected preamble to the scheduling entity in a random access channel (RACH) preamble message. In an example, the scheduled entity may select from 64 possible preamble sequences for inclusion in the RACH preamble message. For example, the random access processing circuitry 544 shown and described above in reference to FIG. 5 may receive the random access preamble message.

At block 904, the scheduling entity may transmit an initial random access response (RAR) message to the scheduled entity. In some examples, the scheduling entity may transmit the initial RAR message to the scheduled entity on the physical downlink control channel (PDCCH). The RAR message may include, for example, an identifier of the preamble sent by the scheduled entity, a Timing Advance (TA), a temporary cell radio network temporary identifier (TC-RNTI) or random access (RA) RNTI for the scheduled entity and a grant of assigned uplink resources. For example, the random access processing circuitry 544 shown and described above in reference to FIG. 5 may transmit the initial RAR message to the scheduled entity.

At block 906, the scheduling entity may receive an uplink L2/L3 message from the scheduled entity. The uplink message may include an identifier of the scheduled entity for use by the scheduling entity in resolving any collisions. In addition, the uplink message may be transmitted by the scheduled entity utilizing the TA and assigned uplink resources. In some examples, the scheduling entity may measure the signal quality of the uplink L2/L3 message and compare the signal quality to a threshold to verify that the scheduling entity actually received an uplink L2/L3 message from the scheduled entity. For example, the scheduling entity may measure one or more of the reference signal received quality (RSRQ), reference signal received power (RSRP) and/or received signal strength indicator (RSSI) to determine that an uplink L2/L3 message was received. For example, the random access processing circuitry 544 in combination with the random access retransmission circuitry 545 shown and described above in reference to FIG. 5 may receive the uplink message.

At block 908, the scheduling entity determines whether the uplink L2/L3 message has been properly decoded. If the uplink L2/L3 message has been properly decoded (Y branch of 908), the process may end. However, if the uplink L2/L3 message is not able to be properly decoded (N branch of 908), at block 910, the scheduling entity may retransmit the random access response message to the scheduled entity. For example, the random access retransmission circuitry 545 in combination with the random access processing circuitry 544 shown and described above in reference to FIG. 5 may determine whether the received uplink L2/L3 message was properly decoded, and if not, retransmit the RAR message to the scheduled entity. The process illustrated between block 906 and block 910 may be repeated after each retransmission, if necessary.

Figure 10:
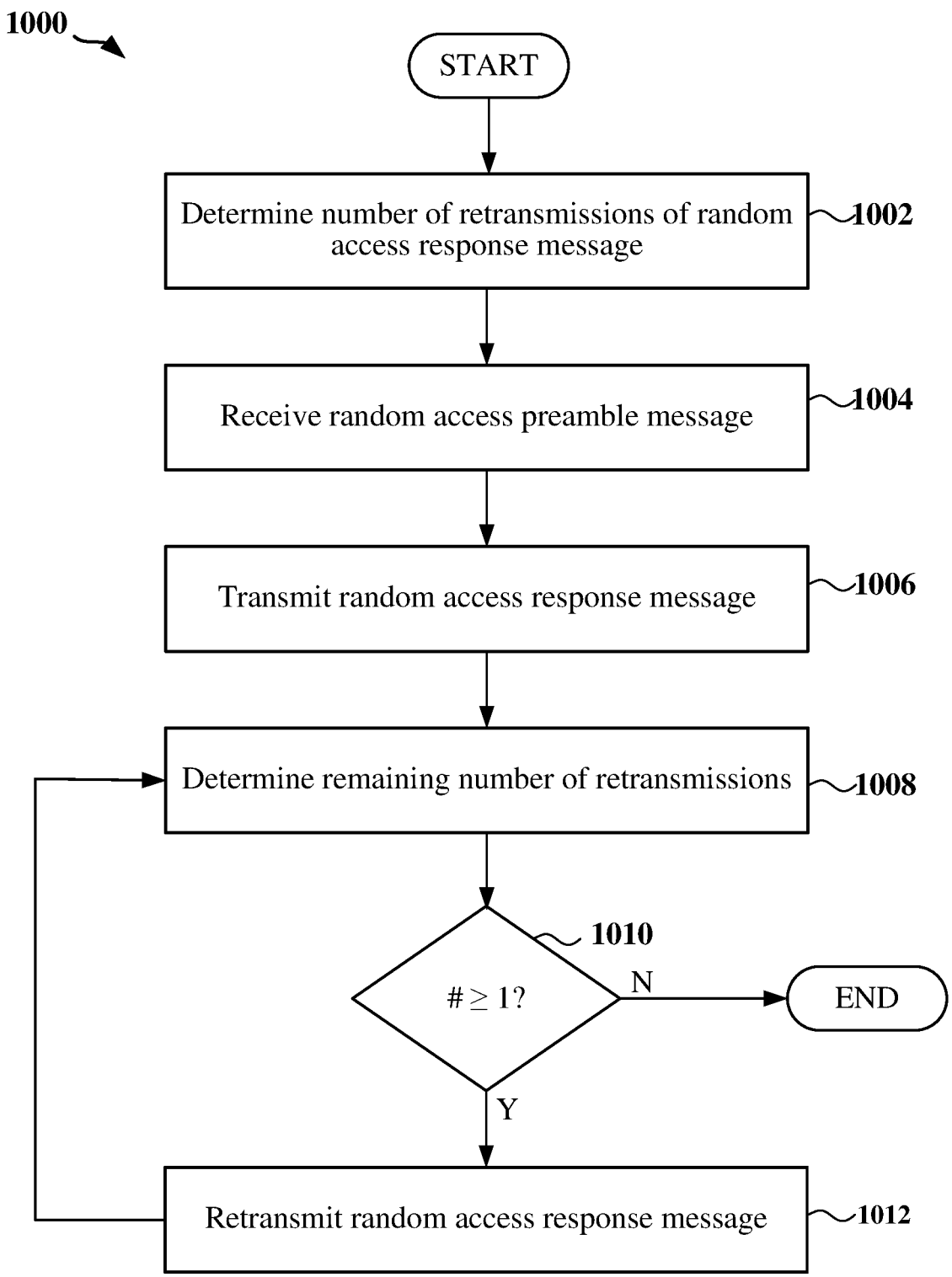
FIG. 10 is a flow chart of another method of wireless communication that provides a random access retransmission procedure.

FIG. 10 is a flow chart illustrating an exemplary process 1000 for performing a random access procedure in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduling entity 500 illustrated in FIG. 5. In some examples, the process 1000 may be carried out by any suitable apparatus or means for carrying out the functions or algorithm described below.

At block 1002, the scheduling entity may determine a number of retransmissions of a random access response message to be transmitted from the scheduling entity to a scheduled entity during the random access procedure. For example, the random access retransmission circuitry 545 shown and described above in reference to FIG. 5 may determine the number of retransmissions. In an example, the scheduling entity may determine a fixed (N) number of retransmissions with a fixed time gap between each retransmission. The number of retransmissions N may be determined, for example, based on the signal strength of a message (e.g., a random access preamble message) received from scheduled entity. For example, the signal strength of the random access preamble message may be based on one or more of the RSRP, RSRQ, RSSI, or other signal strength measurement. The scheduling entity may alternatively receive the number of retransmissions N from the scheduled entity. For example, the scheduling entity may receive the number of retransmissions N from the scheduled entity within a random access preamble message or another license-assisted channel.

At block 1004, the scheduling entity may receive a random access preamble message from a scheduled entity. In some examples, the scheduled entity may randomly select a preamble from an available set of preambles within the cell served by the scheduling entity, and transmit the selected preamble to the scheduling entity in a random access channel (RACH) preamble message. In an example, the scheduled entity may select from 64 possible preamble sequences for inclusion in the RACH preamble message. For example, the random access processing circuitry 544 shown and described above in reference to FIG. 5 may receive the random access preamble message.

At block 1006, the scheduling entity may transmit an initial random access response (RAR) message to the scheduled entity. In some examples, the scheduling entity may transmit the initial RAR message to the scheduled entity on the physical downlink control channel (PDCCH). The RAR message may include, for example, an identifier of the preamble sent by the scheduled entity, a Timing Advance (TA), a temporary cell radio network temporary identifier (TC-RNTI) or random access (RA) RNTI for the scheduled entity and a grant of assigned uplink resources. For example, the random access processing circuitry 544 shown and described above in reference to FIG. 5 may transmit the initial RAR message to the scheduled entity.

At block 1008, the scheduling entity may determine a remaining number of retransmissions of the random access response message. In some examples, the scheduling entity may initialize a counter with the number of retransmissions and decrement the counter by one at each retransmission. For example, the random access processing circuitry 544 in combination with the random access retransmission circuitry 545 shown and described above in reference to FIG. 5 may determine the number of retransmissions remaining.

At block 1010, the scheduling entity determines whether the remaining number of retransmissions is greater than or equal to one. If the remaining number of retransmissions is less than one (N branch of 1010), the process may end. However, if the remaining number of retransmissions is greater than or equal to one (Y branch of 1010), at block 1012, the scheduling entity may retransmit the random access response message to the scheduled entity. For example, the random access retransmission circuitry 545 in combination with the random access processing circuitry 544 shown and described above in reference to FIG. 5 may determine whether the remaining number of transmissions is greater than or equal to one, and if so, retransmit the RAR message to the scheduled entity. The process illustrated between block 1008 and block 1012 may be repeated until the counter decrements to zero.

Figure 11:
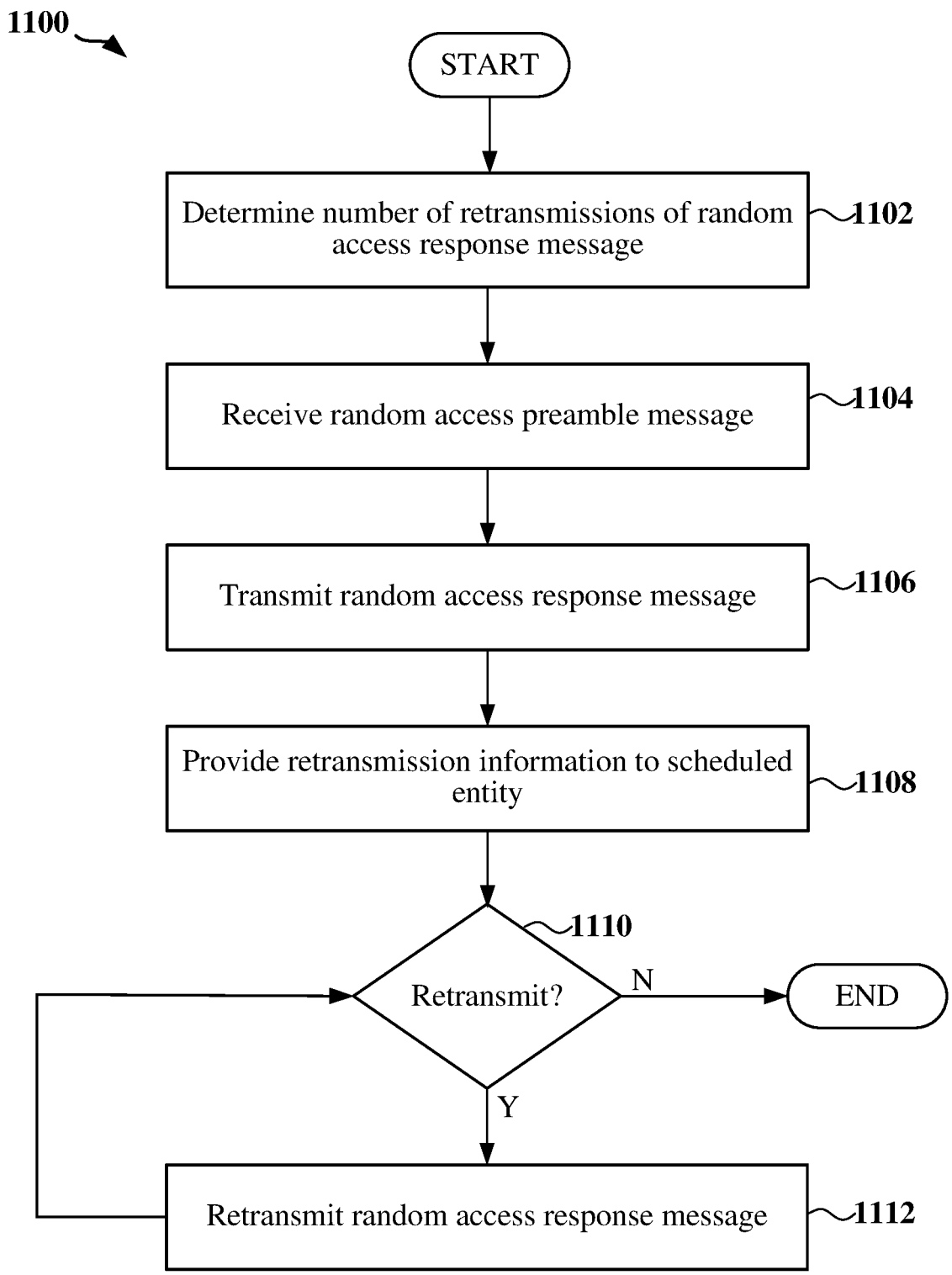
FIG. 11 is a flow chart of another method of wireless communication that provides a random access retransmission procedure.

FIG. 11 is a flow chart illustrating an exemplary process 1100 for performing a random access procedure in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 500 illustrated in FIG. 5. In some examples, the process 1100 may be carried out by any suitable apparatus or means for carrying out the functions or algorithm described below.

At block 1102, the scheduling entity may determine a number of retransmissions of a random access response message to be transmitted from the scheduling entity to a scheduled entity during the random access procedure. For example, the random access retransmission circuitry 545 shown and described above in reference to FIG. 5 may determine the number of retransmissions. In an example, the scheduling entity may determine a fixed (N) number of retransmissions with a fixed time gap between each retransmission. The number of retransmissions N may be determined, for example, based on the signal strength of a message (e.g., a random access preamble message) received from scheduled entity. For example, the signal strength of the random access preamble message may be based on one or more of the RSRP, RSRQ, RSSI, or other signal strength measurement. The scheduling entity may alternatively receive the number of retransmissions N from the scheduled entity. For example, the scheduling entity may receive the number of retransmissions N from the scheduled entity within a random access preamble message or another license-assisted channel.

At block 1104, the scheduling entity may receive a random access preamble message from a scheduled entity. In some examples, the scheduled entity may randomly select a preamble from an available set of preambles within the cell served by the scheduling entity, and transmit the selected preamble to the scheduling entity in a random access channel (RACH) preamble message. In an example, the scheduled entity may select from 64 possible preamble sequences for inclusion in the RACH preamble message. For example, the random access processing circuitry 544 shown and described above in reference to FIG. 5 may receive the random access preamble message.

At block 1106, the scheduling entity may transmit an initial random access response (RAR) message to the scheduled entity. In some examples, the scheduling entity may transmit the initial RAR message to the scheduled entity on the physical downlink control channel (PDCCH). The RAR message may include, for example, an identifier of the preamble sent by the scheduled entity, a Timing Advance (TA), a temporary cell radio network temporary identifier (TC-RNTI) or random access (RA) RNTI for the scheduled entity and a grant of assigned uplink resources. For example, the random access processing circuitry 544 shown and described above in reference to FIG. 5 may transmit the initial RAR message to the scheduled entity.

At block 1108, the scheduling entity may provide retransmission information to the scheduled entity. In some examples, the retransmission information may include one or more of a fixed number of retransmissions, a fixed time gap between each retransmission and/or a number of subframes for retransmission of the RAR message. For example, the random access retransmission circuitry 545 shown and described above in reference to FIG. 5 may provide the retransmission information to the scheduled entity.

At block 1110, the scheduling entity may determine whether the RAR message is to be retransmitted. For example, the scheduling entity may determine a fixed number (N) of retransmissions of the RAR message and then determine a remaining number of retransmissions of the fixed number of retransmissions. If the remaining number of retransmissions is greater than or equal to one, the scheduling entity may determine that the RAR message is to be retransmitted to the scheduled entity. The fixed number of retransmissions N may be determined, for example, based on the signal strength of a message (e.g., a random access preamble message) received from scheduled entity. The scheduling entity may alternatively receive the fixed number of retransmissions N from the scheduled entity. For example, the scheduling entity may receive the fixed number of retransmissions N from the scheduled entity within a random access preamble message or another license-assisted channel. For example, the random access retransmission circuitry 545 shown and described above in reference to FIG. 5 may determine whether the RAR message is to be retransmitted.

If the scheduling entity determines that the RAR message is to be retransmitted (Y branch of 1110), the scheduling entity retransmits the RAR message at block 1112. In an example, if the RAR message is to be retransmitted (N) number of times, at each retransmission (e.g., repeat of block 1112), a counter initialized with N may be decremented by one. When the counter reaches zero, the process ends. For example, the random access retransmission circuitry 545 shown and described above in reference to FIG. 5 may retransmit the RAR message.

Figure 12:
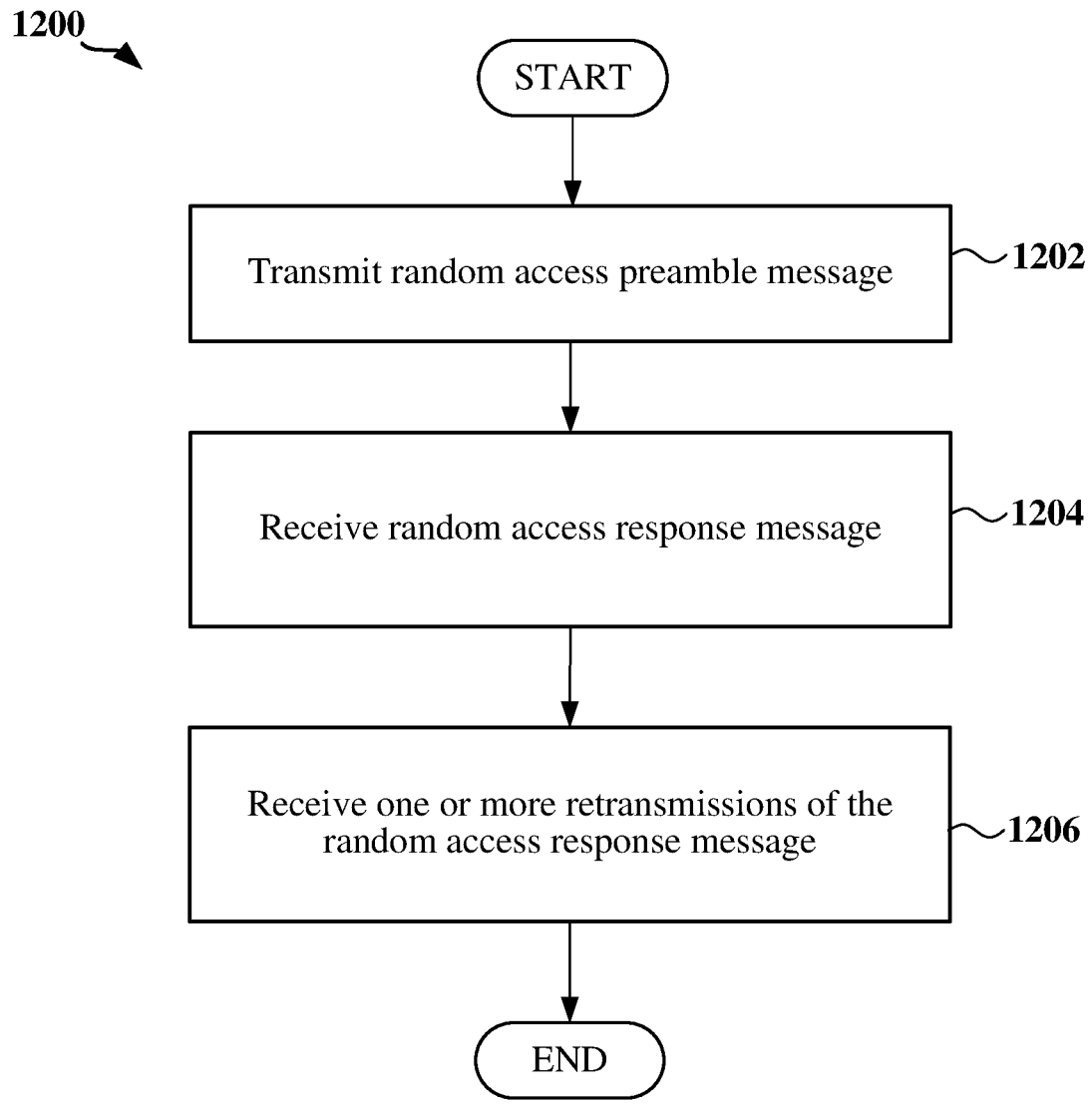
FIG. 12 is a flow chart of another method of wireless communication that provides a random access retransmission procedure.

FIG. 12 is a flow chart illustrating an exemplary process 1200 for performing a random access procedure in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 600 illustrated in FIG. 6. In some examples, the process 1200 may be carried out by any suitable apparatus or means for carrying out the functions or algorithm described below.

At block 1202, the scheduled entity may generate and transmit a random access preamble message to a scheduling entity. In some examples, the scheduled entity may randomly select a preamble from an available set of preambles within the cell served by the scheduling entity, and transmit the selected preamble to the scheduling entity in a random access channel (RACH) preamble message. In an example, the scheduled entity may select from 64 possible preamble sequences for inclusion in the RACH preamble message. For example, the random access processing circuitry 646 shown and described above in reference to FIG. 6 may generate and transmit the random access preamble message.

At block 1204, the scheduled entity may receive an initial random access response (RAR) message from the scheduling entity. In some examples, the scheduling entity may transmit the initial RAR message to the scheduled entity on the physical downlink control channel (PDCCH). The RAR message may include, for example, an identifier of the preamble sent by the scheduled entity, a Timing Advance (TA), a temporary cell radio network temporary identifier (TC-RNTI) or random access (RA) RNTI for the scheduled entity and a grant of assigned uplink resources. For example, the random access processing circuitry 646 shown and described above in reference to FIG. 6 may transmit the initial RAR message to the scheduled entity.

At block 1206, the scheduled entity may receive one or more retransmissions of the RAR message. In some examples, the RAR message may be retransmitted if the scheduling entity either does not receive an uplink L2/L3 message from the scheduled entity within a monitoring window or if the scheduling entity receives the uplink L2/L3 message, but is unable to successfully decode the uplink L2/L3 message. In other examples, the scheduling entity or scheduled entity may determine a fixed number (N) of retransmissions of the RAR message. For example, the random access processing circuitry 646 shown and described above in reference to FIG. 6 may receive the one or more retransmissions of the RAR message.

Figure 13:
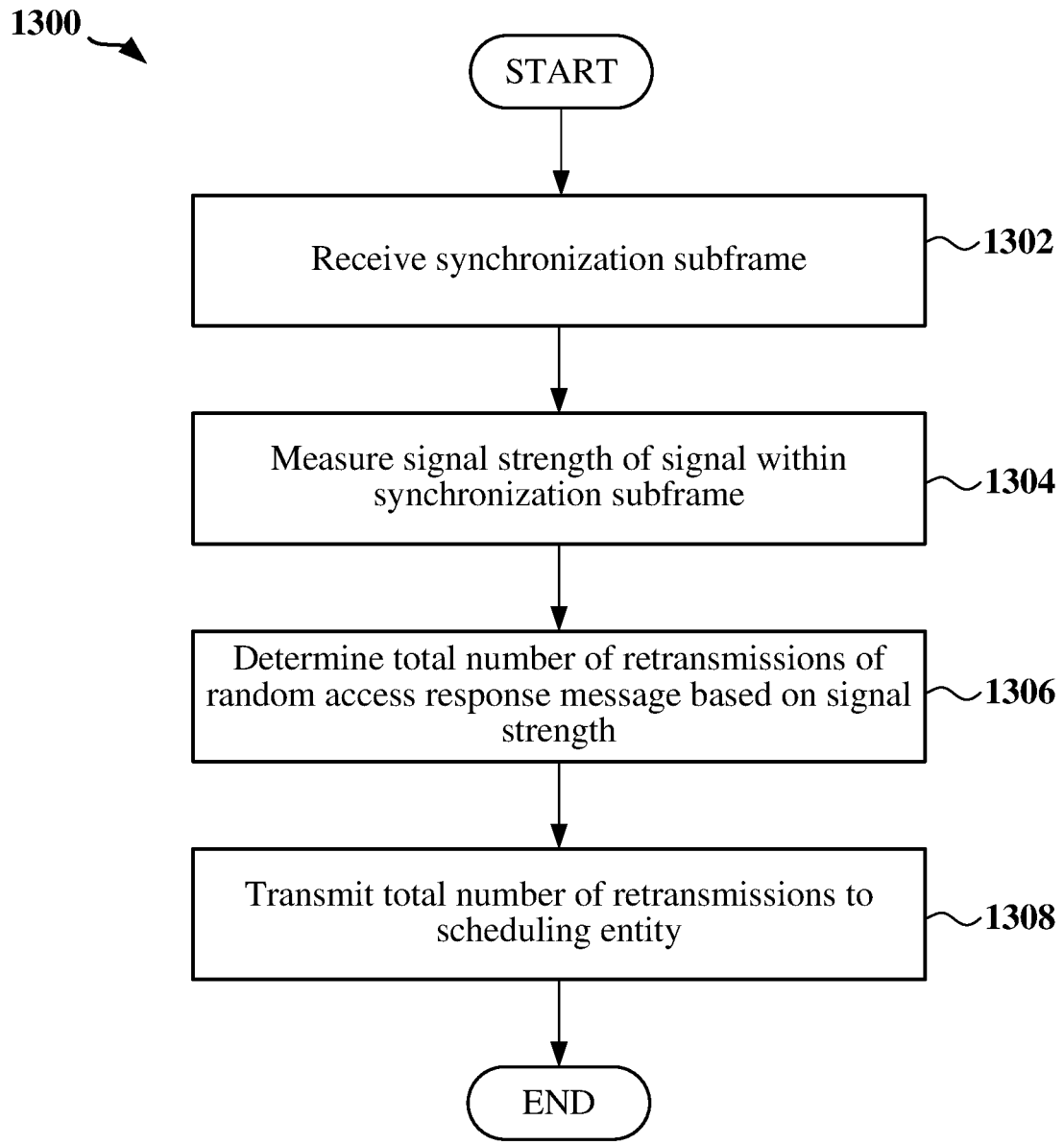
FIG. 13 is a flow chart of another method of wireless communication that provides a random access retransmission procedure.

FIG. 13 is a flow chart illustrating an exemplary process 1300 for determining a number of retransmissions during a random access procedure in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 600 illustrated in FIG. 6. In some examples, the process 1300 may be carried out by any suitable apparatus or means for carrying out the functions or algorithm described below.

At block 1302, the scheduled entity may receive a synchronization subframe carrying one or more reference/synchronization signals, such as the PBCH, primary synchronization signal (P-SCH), secondary synchronization signal (S-SCH) or beam reference signal. At block 1304, the scheduled entity may measure the signal strength of a signal within the synchronization subframe. For example, the scheduled entity may select the best beam transmitted during a synchronization subframe and measure the signal strength (e.g., signal-to-interference-plus-noise ratio (SINR)) of the selected beam. For example, the DL data and control channel reception and processing circuitry 644 shown and described above in connection with FIG. 6 may receive the synchronization subframe and measure the signal strength of a signal within the synchronization subframe.

At block 1306, the scheduled entity may determine a total number of retransmissions of a random access response message based on the signal strength measurement. In some examples, the scheduled entity may maintain a table of signal strength ranges and corresponding numbers of retransmissions and index on the table to identify the number of retransmissions to be utilized based on the measured signal strength. In some examples, the table may be configured such that lower signal strengths require more retransmissions than higher signal strengths. For example, the random access processing circuitry 646 shown and described above in connection with FIG. 6 may determine the total number of retransmissions.

At block 1308, the scheduled entity may transmit the total number of retransmissions of the random access response message to the scheduling entity. In some examples, the number of retransmissions may be transmitted within the RACH preamble message. In this example, each preamble sequence may be increased by one or more bits to indicate the number of requested retransmissions. In another example, the number of retransmissions may be transmitted in a license-assisted channel, such as a legacy (4G) channel or a 5G sub 6 GHz channel. For example, the random access processing circuitry 646 may operate in coordination with the UL data and control channel generation and transmission circuitry 642 shown and described above in connection with FIG. 6 to transmit the total number of retransmissions to the scheduling entity.

Figure 14:
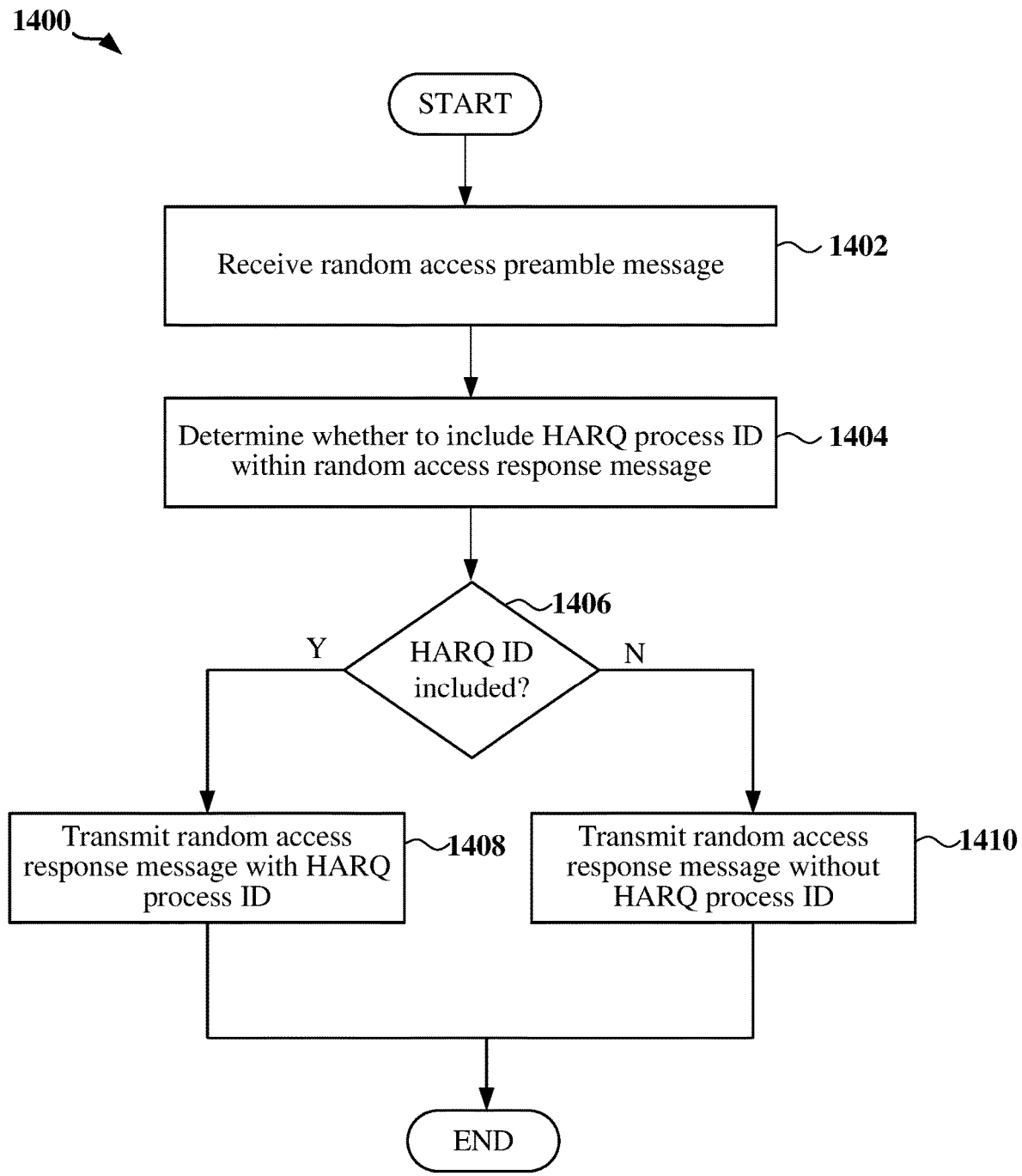
FIG. 14 is a flow chart of a method of wireless communication that provides for HARQ process identifiers (IDs) within random access response messages.

FIG. 14 is a flow chart illustrating an exemplary process 1400 for providing HARQ process identifiers (IDs) within random access response messages in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 500 illustrated in FIG. 5. In some examples, the process 1400 may be carried out by any suitable apparatus or means for carrying out the functions or algorithm described below.

At block 1402, the scheduling entity receives a random access preamble message from a scheduled entity. For example, the random access processing circuitry 544 shown and described above in reference to FIG. 5 may receive the random access preamble message. At block 1404, the scheduling entity determines whether to include a HARQ process ID within a random access response message generated in response to the random access preamble message. For example, the HARQ process ID selection circuitry 548 may determine whether to include the HARQ process ID within the random access response message based at least on the type of random access procedure (e.g., contention or non-contention) being used by the scheduled entity. In some examples, the HARQ process ID is included in the random access response message for both contention and non-contention based random access procedures. In other examples, the HARQ process ID is only included in the random access response message for non-contention based random access procedures.

If the HARQ process ID is to be included in the random access response message (Y branch of block 1406), at block 1408, the random access response message is transmitted to the scheduled entity with a HARQ process ID. For example, the random access processing circuitry 544 may operate in coordination with the HARQ process ID selection circuitry 548 shown and described in reference to FIG. 5 to select a HARQ process ID for an uplink grant and include the selected HARQ process ID and uplink grant within the random access response message. However, if the HARQ process ID is not to be included in the random access response message (N branch of block 1406), at block 1410, the random access response message is transmitted to the scheduled entity without a HARQ process ID. For example, the random access processing circuitry 544 may generate and transmit the random access response message.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication between a scheduling entity and a set of one or more scheduled entities in a wireless communication network, the method comprising:
   receiving a random access preamble message during a contention-based random access procedure at the scheduling entity from a scheduled entity of the set of one or more scheduled entities;
   determining a total number of retransmissions of a random access response message; splitting random access response information of a first instance of the random access response message into a first information block and a second information block to produce a first code word based on the first information block and a second code word based on the second information block, wherein the first information block and the second information block each comprise different respective information bits of the random access response information;
   including the total number of retransmissions within each of the first code word and the second code word;
   transmitting the random access response message comprising the first code and the second code word from the scheduling entity to the scheduled entity in response to receiving the random access preamble message, wherein the random access response message further comprises an indication of a number of subframes to be used to subsequently retransmit the random access response message; and
   automatically retransmitting the random access response message from the scheduling entity to the scheduled entity each of the total number of retransmissions utilizing the number of subframes.

2. The method of claim 1, wherein retransmitting the random access response message from the scheduling entity to the scheduled entity further comprises:
   determining a remaining number of retransmissions of the random access response message after retransmission of the random access response message; and
   repeating retransmission of the random access response message from the scheduling entity to the scheduled entity based on the remaining number of retransmissions.

3. The method of claim 1, wherein transmitting the random access response message from the scheduling entity to the scheduled entity further comprises:
   transmitting, within the random access response message, an indication of a number of subframes used to transmit the random access response message.

4. The method of claim 1, wherein determining the total number of retransmissions of the random access response message further comprises:
   determining the total number of retransmissions of the random access response message and a fixed time gap between each of the retransmissions prior to receiving the random access preamble message from the scheduled entity.

5. The method of claim 4, further comprising:
   providing the fixed time gap between each of the retransmissions to the scheduled entity.

6. The method of claim 5, wherein providing the fixed time gap between each of the retransmissions to the scheduled entity further comprises:
   transmitting the fixed time gap between each of the retransmissions to the scheduled entity over a physical broadcast channel.

7. The method of claim 5, wherein providing the fixed time gap between each of the retransmissions to the scheduled entity further comprises:
   transmitting the fixed time gap between each of the retransmissions to the scheduled entity within a first random access response message.

8. The method of claim 5, wherein providing the fixed time gap between each of the retransmissions to the scheduled entity further comprises:
   transmitting the fixed time gap between each of the retransmissions to the scheduled entity within a license-assisted channel.

9. The method of claim 1, wherein determining the total number of retransmissions of the random access response message further comprises:
   measuring a signal strength of the random access preamble message; and
   determining the total number of retransmissions of the random access response message based on the signal strength.

10. A scheduling entity in a wireless communication network, comprising:
    a transceiver for wireless communication with a set of one or more scheduled entities; a memory; and
    a processor communicatively coupled to the transceiver and the memory, the processor and the memory configured to:
      receive a random access preamble message at the scheduling entity during a contention-based random access procedure from a scheduled entity of the set of one or more scheduled entities via the transceiver;
      determine a total number of retransmissions of a random access response message;
      split random access response information of a first instance of the random access response message into a first information block and a second information block to produce a first code word based on the first information block and a second code word based on the second information block, wherein the first information block and the second information block each comprise different respective information bits of the random access response information;
      include the total number of retransmissions within each of the first code word and the second code word;
      transmit the random access response message comprising the first code word and the second code word from the scheduling entity to the scheduled entity in response to receiving the random access preamble message, wherein the random access response message further comprises an indication of a number of subframes to be used to subsequently retransmit the random access response message; and
      automatically retransmit the random access response message from the scheduling entity to the scheduled entity each of the total number of retransmissions utilizing the number of subframes.

11. The scheduling entity of claim 10, wherein the processor is further configured to:
    determine the total number of retransmissions of the random access response message and a fixed time gap between each of the retransmissions prior to receiving the random access preamble message from the scheduled entity.

12. The scheduling entity of claim 11, wherein the processor is further configured to:
provide the fixed time gap between each of the retransmissions to the scheduled entity.

13. The method of claim 1, wherein the random access response message comprises a hybrid automatic repeat request (HARQ) process identifier.

* * * * *